United States Patent [19]
Koski et al.

[11] Patent Number: 5,596,502
[45] Date of Patent: Jan. 21, 1997

[54] COMPUTER SYSTEM INCLUDING MEANS FOR DECISION SUPPORT SCHEDULING

[75] Inventors: Robert E. Koski; Kenneth R. Henderson; Christopher R. Barlow, all of Sarasota, Fla.

[73] Assignee: SunOptech, Ltd., Sarasota, Fla.

[21] Appl. No.: 339,520

[22] Filed: Nov. 14, 1994

[51] Int. Cl.$^6$ .................................................. G06F 19/00
[52] U.S. Cl. ........................... 364/468.01; 395/919
[58] Field of Search .................................. 364/468, 478, 364/401–403; 395/919, 925, 926, 904, 650

[56] References Cited

U.S. PATENT DOCUMENTS

| | | | |
|---|---|---|---|
| 5,233,533 | 8/1993 | Edstrom et al. | 364/468 |
| 5,255,181 | 10/1993 | Chapman et al. | 364/468 X |
| 5,369,570 | 11/1994 | Parad | 364/468 X |
| 5,406,476 | 4/1995 | Deziel, Jr. et al. | 364/468 X |
| 5,444,632 | 8/1995 | Kline et al. | 364/468 |

*Primary Examiner*—Joseph Ruggiero
*Attorney, Agent, or Firm*—Oblon, Spivak, McClelland, Maier & Neustadt, P.C.

[57] ABSTRACT

A demand driven pull-through computerized decision support scheduling system— The Cube System— employing a CUBEBOOKING Program operating in near real time to load Jobs (a sequence of predefined process) in CubeCells at a Workspace in Time defined in a selected Cube World in response to demand placed on the Cube World by a customer order, which program allocates the best available resources to produce products (Product Resources) composed of materials (Material Resources on a Positive Bill of Materials) having Features (contained in a Negative Bill of Materials). The Cube System operates to keep track of alternate probable process paths by scoring systems and retains resource usage production history patterns as Prime Data to resolve conflicts between capacity-limited resources (Resource Contentions). The CUBEVIEW Program provides three dimensional representations of Demand and Supply of Resources (displayed on the z axis) at Workspaces (displayed on the y axis) in Time (displayed on the x axis) by a series of Cube Views, and displays Resource contentions, the presence of which requires user intervention to rotate the cube display to examine the z, y axis (Resources, z, on the horizontal axis; Workspaces y, again on the vertical axis, at time=0, a given Time Cell) for contentions. Using the view the system recommends alternative reallocation of Resources to other Workspaces to eliminate Resource Contentions in the various Cube Cells.

11 Claims, 16 Drawing Sheets

TRADITIONAL PROCESS LINE CONFIGURATION

COMPUTER SYSTEM INCLUDING MEANS FOR DECISION SUPPORT SCHEDULING

CROSS REFERENCE TO RELATED APPLICATIONS:

This application is related to commonly-owned application Ser. No. 07/986,727, filed Dec. 8, 1992, now U.S. Pat. No. 5,524,210, by the same inventors entitled Asynchronous Systems and Method for Electronic Data Management Storage and Communication which discloses and claims an asynchronous computer communication system of the type which can be used to communicate with the several computers used to implement the scheduling system of this application, the disclosure of which is hereby incorporated by reference.

FIELD

This invention relates generally to computerized management systems, and more particularly to computer-controlled closed loop multiple activity management coordinating systems that support effective resource utilization decision making and alternate path non-deterministic process development, including rule based learning functions to efficiently allocate resources to resolve conflicts in competition for the availability of limited resources to achieve multiple objectives scheduled in time. A specific example is directed to a demand driven, pull-through, non-deterministic, computerized support scheduling decision system employing macro-scheduling software and micro-scheduling software objects linked by communication software, preferably an asynchronous communications system able to assist in managing complex manufacturing operations in near real time via general purpose computers linked in a network or via E-mail and exhibiting historical and rule based learning capability for more efficient scheduling, effective use of resources, and timely delivery of products while increasing staff productivity and reducing hassle.

BACKGROUND

Computer Systems:

In most companies, computers have historically been controlled by accounting departments where the accounting oriented mangers have developed computer systems which, like their accounting systems, are deterministic, viewing the present and future in the same manner as the past. But the present is a moving point in time, cannot be "frozen," and must be constantly updated. The past can be viewed as a fact, more or less "hard," depending on the quality and quantity of records made at or near the time of occurrence and on the interim system of fact preservation. But, the future should be viewed not as fact but as multiple alternate sequences of probably events. Sometimes the future can be reasonably predicted by an extrapolation of the past, but probabilistic uncertainty should always be considered, because uncertainty is real.

Scheduling Systems:

Most scheduling systems were developed to serve accounting oriented managers who wanted to treat the future as factually as the past. One example of this is the notion that future events can be scheduled, in detail, in advance. The truth is that both known and unknown variables introduce uncertainty which defy precise detailed scheduling. These variables frequently produce bottlenecks and resource shortages that require real-time schedule revisions. In most organizations the ability to report or willingness to admit that schedule revisions are necessary is always awkward and is sometimes subject to punishment. As a result, the real world in the organization is quite different from the computer system's view.

Manufacturing Systems:

In regard to manufacturing scheduling, rescheduling and delivery, a manufacturing organization is continually receiving orders for products that require the shared use of resources and workspaces with conflicting time requirements. Without reliable knowledge of the existence of resources and time constraints of resources ("availability") an organization is unable to accurately forecast its ability to meet requested deliveries.

Current scheduling practices almost never compare, or even consider, commitments made versus actual resources available over a finite period of time. Traditionally, allocations are made against historical capacity and result in an arbitrary production target either in dollars or a mixture of product units. Under currently used scheduling systems, attempts to measure capacity limitations due to resource constraints typically utilize an iterative process that requires so much computer capacity that it is never current, except in a very general and only approximate sense. This is reflective of the recognition that iterative processes are useful only for systems that converge to an asymptotic valve, e.g., a constant supply figure, such as 10 gallons paint per day.

In contrast, where set points vary frequently, while current systems attempt to allocate resources, they almost never consider real time changes in actual schedules. Production is presumed to proceed according to schedule. As a result, most production schedules include operations that were "supposed to have been completed" but were not, and the subsequent departments are not informed, resulting in complete disruption of forward scheduling. Such current systems, which view the future deterministically (deterministic modeling), result in underutilized major resources (like machine tools), and heavy duplication of floating resources (like tools, fixtures, and inventory) and still do not achieve time production.

The conventional Manufacturing Requirements Planning Systems (MRP Systems) have two traps which must be avoided:

1. The first trap is related to the processing of the data by computer systems. The sheer quantity of data involved in planning the utilization of every resource in the production of a product cause even large computers to grind to a halt when traditional forward-chaining programming approaches are used. It is a "long way" from the product back through all its sub-assemblies, components, and resources to the workspace and most systems cannot follow that long a path in a reasonable amount of time, let alone consider any of the alternate probable paths at each branch.

2. The second trap is related to the competitive strength of the organization: When a product is defined in enough detail for the Conventional MRP System to plan all resources back to the Workspaces used to produce that product, the tendency will be to "freeze" the processes for producing that product. No further improvements will be made in production, safety, hassle factor, consistency, or costs. Benefits of new production techniques will be lost. The organization is a standing target for its competitors who might learn to employ better production methods. An effective decision support system will assist an organization in examining alternative production methods, learning better paths, and recommending global improvements.

In the broader view, these two traps are those of micro-scheduling, looking at data apart from the meaning of that data for scheduling, as a result of which product design change becomes inflexible, a victim of the scheduling demand.

New Product Design:

In regard to management of new product design, an organization must have or develop manufacturing capabilities or sources of supply for the component parts of its proposed new products. More specifically, the limits of existing production capacity cannot be exceeded without either: (1) adding resources (labor, machines, fixtures, tooling, etc.); or (2) finding new outside resources; or (3) process improvements (yield and throughput).

Product design engineers almost never consider the limits of established internal or external capabilities when designing new products. For example, a design engineer may typically design a new product with, say, a 0.25 inch diameter hole 12 inches deep without ever first determining whether or not: (1) a drill that size and that long exists in the tool inventory (or even in a drill vendor's catalog); or (2) a machine exists in-house (or even at an establishment subcontractor's plant) capable of drilling a 12 inch deep hole. Manufacturing capability is not a typical concern for a design engineer. Rather, it is taken erroneously as a given.

As a result, it is not uncommon for shop floor workers to be the discoverers of the fact that tools, fixtures and even machines do not exist to, say, drill a 0.025 inch diameter hole 12 inches deep. All too often this discovery is made just before a new product is supposed to be shipped to a customer. The iterative recovery process that results is usually embarrassing, expensive, people intensive, and time consuming; but it has become so common that it is wryly expected as normal.

Unfilled Need in the Art:

The above are just a few areas in which current scheduling systems are wholly inadequate to deal with the ever increasing complexity of efficiently manufacturing high technology, multi-component products, and more generally to manage effective resource utilization. Accordingly, there is an enormous, unmet need for realistic scheduling and effective resource utilization.

THE INVENTION

Objects:

It is among the objects of this invention to provide improved computer-controlled closed loop management systems that result in more efficient, cost effective physical operations in near real time, namely a demand-driven, pull-through, non-deterministic, dynamic computerized closed loop support scheduling decision system employing macro-scheduling and micro-scheduling software objects linked by communications software, and which includes rule-based learning functions to efficiently allocate resources to resolve conflicts in competition for the availability of limited resources to achieve multiple objectives scheduled in time.

It is another object of this invention to provide a decision support scheduling system which predetermines and defines the processes performed at a physical workspace and memorializes them as "Features" in a form called a "Negative Bill of Materials."

It is another object of this invention to provide a decision support system which is designed to assist in dealing with the impact of the Henderson Test-In-Time Scheduling Uncertainty Principle.

It is another object of this invention to provide a computer-controlled decision support system employing a CUBEVIEW and/or a CUBEBOOKING program(s) which instruct a computer system hardware and operations thereof to control manufacturing and service operations and particularly scheduling systems for such operations.

It is another object of this invention to describe manufactured products (and also services to be performed) in terms of features and materials, including negative and positive bills of materials.

It is another object of this invention to provide a unique orthogonal 0, 0, 0 reference system for specification, identification and location of features, workspaces, and indeed everything in an organization.

It is another object of this invention to provide a system for displaying and resolving resource contentions.

It is another object of this invention to provide a system for tracking resources required to perform work to be done.

It is another object of this invention to provide a system which encourages dynamic (proactive) decision making by shifting from management by time to require reaction, to multiple ranked future alternatives as a means of dealing with uncertainty.

It is another object of this invention to provide a computer hardware system, also referred to as system architecture, which includes in one or more components, inter alia: (1) means for identification of features; (2) a means for describing products in terms of features and materials; (3) means for specifying, identifying, referencing and locating features, products, equipment, personnel and workspaces; (4) means for tracking resources; (5) means for real time scheduling; (6) means for multiply ranking future alterations; (7) means for decision support; (8) means for display of scheduling factors; (9) means for defining processes performed at a workspace and memorializing them as features; and (10) means for booking of products to be produced or services to be performed.

Still other objects will be evidence from the Specification, Drawings and Claims.

BRIEF DESCRIPTION OF DRAWINGS

The invention is illustrated with reference to the drawings in which.

APPENDICES

Figure 1:
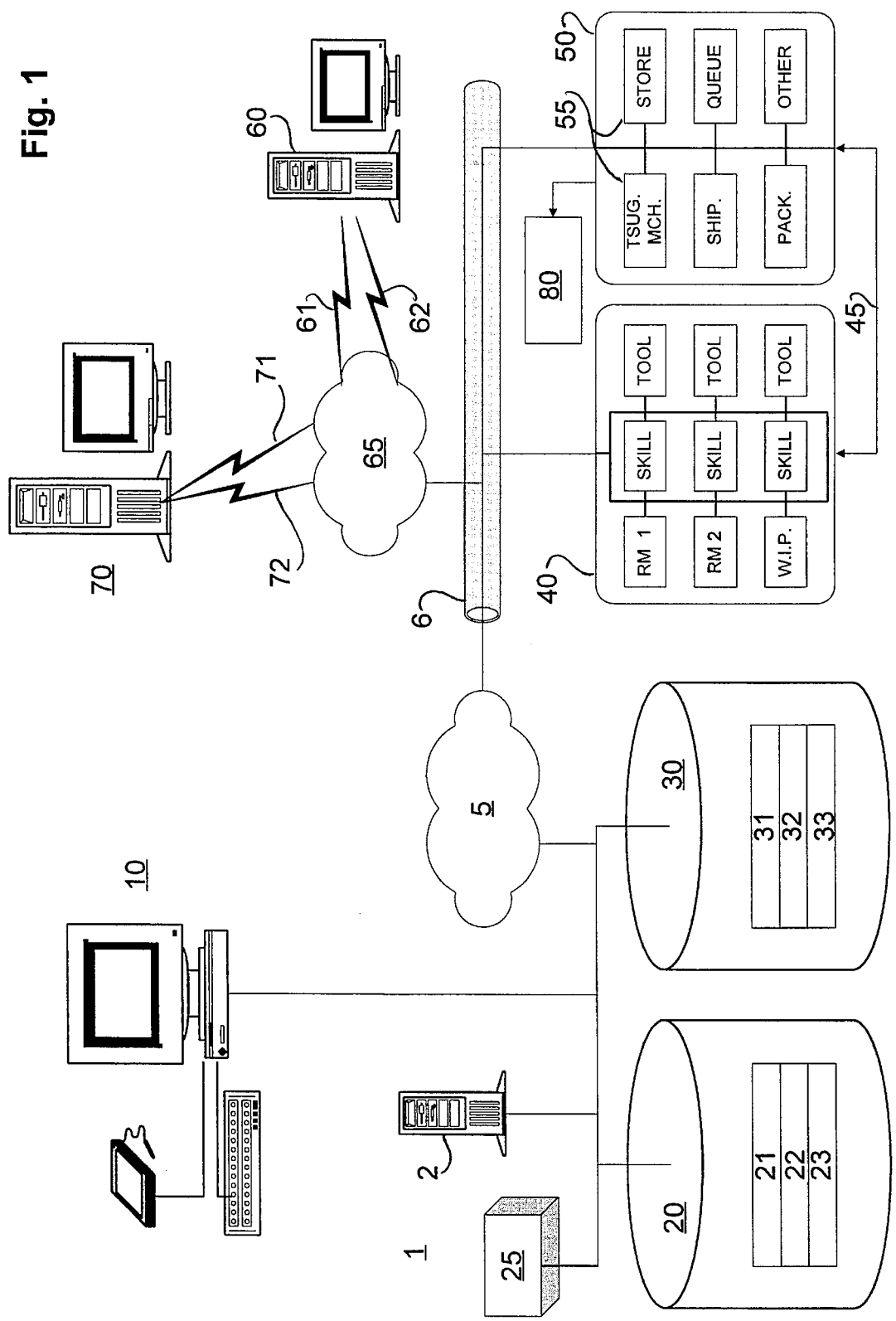
FIG. 1 is a schematic of one embodiment of the computer hardware system architecture of this invention.

Appendix A is an example of the Negative Bill of Material (NBOM) employing features to define a valve body. The NBOM is a list of the features that the Cube System is able to provide given the resources and workspaces available.

The NBOM describes the article to be built or manufactured and provides, in this case, the spatial characteristics associated with each feature.

Appendix B is the pseudo code for the Cube System of this invention.

SUMMARY OF THE INVENTION

The invention comprises a computer system which includes software means for control of near-real time decision support scheduling using predetermined "doability" (the capability to produce Features necessary to produce a product/service) during new product design, and, in a similar fashion, at order entry, using predetermined "doability" and "availability" (the ability to make tentative appointments to muster all required resources for the necessary time period to perform the required processes at a workspace at a specified future date and time).

While the computer hardware system of this invention can be embodied in logic circuits, the best mode embodiment of the invention is preferred to be platform-independent by use of the special software described herein which configures and converts a general purpose computer to a special purpose computer system having means for decision support scheduling, including a plurality of sub-means including: (1) software means for identification of features; (2) means for describing products in terms of features and materials; (3) means for specifying, identifying, referencing and locating features, products, equipment, personnel and workspaces; (4) means for tracking resources; (5) means for real time scheduling; (6) means for multiply ranking future alterations; (7) means for decision support; (8) means for display of scheduling factors; (9) means for defining processes performed at a workspace and memorializing them as features; and (10) means for booking of products to be produced or services to be performed.

The Henderson Uncertainty Principle describes the paradox created by Just-In-Time (JIT) scheduling. It is based on the reality that in all work situations there are four variables:

1. Jobs;
2. Workplaces;
3. Resources required to perform work; and
4. Time Blocks.

The Henderson Uncertainty Principle states that the more one predefines any one or any combination of these variables, the less certain one can be of the availability of the remaining variables, and the less certain one can be of the real cost of jobs.

This JIT problem can be managed by the Cube System of this invention in which the variables are visualized as a cube, with time blocks, workplaces, and resources on the three axis (X, Y and Z), which can display contentions for resources when jobs are assigned cell locations along the time axis. The CUBE SYSTEM of this invention is a computerized demand-driven pull-through feature-based decision support scheduling system which employs a general purpose computer programmed with two special programs, called respectively, the CUBEVIEW and the CUBEBOOKING program. The CUBEBOOKING Program (CBP) makes appointments in near real time for Jobs (a sequence of predefined processes) at a Workspace (a defined physical place), predetermined units of time (Time Cells) in a selected environment (Cube World) in response to demand for activity placed on the Cube World by a customer order. The CBP appointment software allocates the best available resources to produce products (Product Resources) composed of materials (Material Resources contained in a Positive Bill of Materials) having Features (contained in a Negative Bill of Materials). The CUBE SYSTEM decision support scheduling software operates to keep track of alternate probable process paths by scoring the success of system operations, and retains resource usage history patterns as Prime Data to assist in resolving conflicts between resources that are inevitably capacity-limited (Resource Contentions). The second key program, the CUBEVIEW program, is a display program which provides a series of three dimensional representations to a computer monitor (also displayable as a hard copy printout from a computer printer) of Demand and Supply of Resources (displayed on the z axis) at Workspaces (displayed on the y axis) in Time (displayed on the x axis), and includes display of Resource contentions, the presence of which requires user intervention. The computerized system of the invention also includes software means for recommending alternative reallocation of Resources to other Workspaces to eliminate Resource Contentions in the various Time Cells.

Thus, a key aspect of the invention is that it comprises a general purpose computer programmed with two special programs to perform the decision support scheduling of this invention. These two programs are the CUBEVIEW and CUBEBOOKING programs (also herein called "software means") which represent the same real world to both the shop floor and the front office, with the result that:

1. Schedule revision decisions can be made and reviewed in near real time. The office knows exactly what is really happening on the shop floor and has the ability to suggest alteration of scheduling priorities. The shop floor has access to the same information and can make revisions in essentially real time. Information concerning schedule revisions that impact customers can be relayed to them at the earliest possible moment (as the need to revise schedules becomes clear). Because more realistic commitments to customers can be made, relations with customers based on credibility grow stronger.

2. Many cost adding, but not value adding, middle management activities can be eliminated by more efficiently conveying and interpreting management's priorities/orders/opinions through the "chain of command," and to report shop floor activities back to management. The result is a "flatter" organization chart with fewer "levels of command." More realistic requests of suppliers (and employees) can be made.

The functions and interrelationships of these two control program methods, CUBEVIEW and CUBEBOOKING, are summarized as follows:

The CUBEVIEW provides a dynamic, moving, three dimensional view of workspaces, resources and time:

A. The first axis, typically the vertical (Y) axis, lists "workspaces"—workcenters for fixed resources and storage places for floating resources.

B. The second axis, typically the front-to-back (Z) axis, lists all resources (raw material, labor, tools, fixtures, etc.) which must be available at the identified workspace in order to perform scheduled work.

C. The third axis, typically the horizontal (X) axis, shows available time dynamically moving from right to left, with Now normally at the left end of the line. The immediate future is nearest Now. The distant future is further right.

D. CubeCells in the Cube show the location and "availability" at workspaces of resources in time. The CUBE- VIEW program provides a dynamic picture of shop floor activity. As jobs are completed they move into history as the time blocks for completed jobs move off the left end of the time axis. As new jobs are added, they are placed in a workspace job queue. As jobs are shifted in a queue or moved to other workspace queues, the presence or absence of necessary floating resources at the workspace is displayed, along with the present location of any missing resources and whether those resources are committed to other jobs during that time span. If a workspace (e.g., a machine) is shut down, the job queue for that workspace stops moving and the job queue gets pushed to the right in Time.

The CUBEBOOKING program first develops lists of primary and alternate workspaces and floating resources that could be employed to complete a specific job without considering the availability of these resources. It then attempts to load these jobs into workspace queues during desired time blocks to see if the floating resources will be available in those time blocks. To find a best fit, the CubeBooking program will:

A. For a given job, identify and locate any resources missing from all logical workspaces in order to establish a prioritized list of desirable workspaces.

B. Try to load jobs in these different workspace queues according to these priorities.

C. The CUBEBOOKING program will then attempt to make appointments for missing resources at a workspace during desirable time blocks.

D. If contentions for any resources exist during the time blocks picked, the CUBEBOOKING program will shift jobs to other desirable time blocks. Failing to fit jobs into desirable time blocks at one workspace, the CUBEBOOKING program will try to shift jobs to other workspaces or shift other jobs to make space.

E. During this process, scarce resources are highlighted so they can be monitored for projected critical shortages.

The benefits of the decision support system of this invention employing this software, as it relates to just four areas (Engineering, Marketing, Accounting and Manufacturing), are:

A. ENGINEERING:
1. Real or anticipated "doability" (the existence of all necessary resources such as machines, fixtures, tools, raw material, etc.) can be determined concurrently (in near real time) during the new product design process.
2. Standard costs of processes and materials can be calculated, and/or optimized, concurrently during the design process to meet targets.
3. Customer prices can be calculated concurrently during the design process.
4. Because of the above, profit margins can be calculated concurrently during the design process and adjusted to meet targets if needed or desired.

B. MARKETING:
1. Using the CUBEVIEW and CUBEBOOKING programs, accurate delivery forecasts can be made concurrently with order entry. Modifications to delivery schedules can be made at any time with assurance of "doability" and "availability."
2. Where prices and costs are calculated with computer programs, profit margins can be accurately projected during the design process, at order entry, and as order quantities and delivery dates are modified.
3. Product release timing decisions can be reviewed prior to commitment to assure production "doability" and "availability" of these resources at a future point in time based on a variety of sales projections.

C. ACCOUNTING:
1. Expected margins on booked and proposed new business and cash flow can be more accurately projected.
2. Probable financial consequences of excess or under production capacity for any future date can be estimated. Production expansion investment decision to acquire new or alternate resources such as outside sources, labor, machines, fixtures, tools, raw material, parts inventory, etc. can be reviewed after adding existing business, including new product releases, if any.
3. With reasonably accurate new order forecasts and open production capacity forecasts, inventory investments can be balanced against desired customer service levels.

D. MANUFACTURING:
1. Current (near or essentially real time) information is visually presented on the shop floor on monitors or printouts which display order requirements and resource availability along with various probable alternatives to achieve production objectives.
2. Using the CUBEVIEW and CUBEBOOKING programs of this invention, scheduling changes to avoid potential bottlenecks (timing or capacity contentions for scarce resources) can be visualized. Utilization of resources can be optimized. The consequences of forced production schedule revisions due to unexpected shop floor happenings are always visible for real time review and revision.
3. Future investments forecasts for labor, machines, fixtures, tools, raw materials, etc. can be fleshed out objectively. Desirability and timing to obtain new or duplicate staff, machinery, fixtures, tooling, etc. becomes evident in advance of a shortage and not because of a shortage.
4. The Cube System permits more nearly real-world catastrophe scenario game playing.

In summary, the decision support scheduling system of this invention (meaning both hardware and software) enables an organization to become much more pro-active because present and future product production constraints are constantly available for review. As each new order or request enters, and each shipment or operation on a part is completed, a new world of requirements unfolds for analysis, minimizing reactive time consuming iterations (request, denial, revised request, etc.) through a management bureaucracy.

The prior art, traditional, people-intensive process is replaced under the system of this invention by a highly visible and constantly changing view of production capabilities. For example, the temporary loss of, say, a machine tool or fixture automatically triggers the CUBEVIEW and CUBEBOOKING programs to alter schedules to resolve any new contention for the remaining available resources. Schedule adjustments would be made "on the fly."

Potential bottlenecks due to contentions for scarce resources are displayed on monitors by the computer for analysis both in advance and during the production process, to alert production personnel of the risks inherent in arbitrary schedule revisions, thereby utilizing scarce resources more fully.

The "real world" on the shop floor has a profound influence on manufacturing profitability and customer service levels. But currently shop floor events are rarely understood or appreciated by office personnel, especially in larger organizations. Not surprisingly, absent this understanding, animosity often develops between office and factory workers-sometimes with devastating consequences. A major byproduct of the system of the invention is the elimination of this shop-office communication barrier.

DETAILED DESCRIPTION OF THE BEST MODE

The following detailed description illustrates the invention by way of example, not by way of limitation of the principles of the invention. This description will clearly enable one skilled in the art to make and use the invention, and describes several embodiments, adaptations, variations, alternatives and uses of the invention, including what we presently believe is the best mode of carrying out the invention.

Cube System:

The Cube System is a general purpose computer that has installed thereon and is capable of executing a set of computer software to support the decisions an organization makes to muster Resources at Workspaces in Time to fulfill Orders. The term "support" includes but is not limited to: data gathering and storage; logic operations; evaluation, including comparison and triggering of different messages; communication; decision tree filtering, decision execution, prioritization; alerting; displaying (both on monitor and hard copy printing), and inventorying. Key features of the Cube System are:

Demand-driven:

It responds to exogenous demand by matching its known supply capability to the demand and noting any differences between capability and demand.

Pull-through:

It generates endogenous demand for its own Features and Resources and places exogenous demand on other Cubes in adjusting its supply to its demand.

Unitary:

All demands and supplies are first reduced to a unitary level. For example, an order for 100 items are reduced to 100 orders for one item. This granularity allows booking of resource appointments at a unit level and allows capture of lot, serial, how-built, and the like, prime data.

Object oriented:

It is composed of a general purpose computer system that is programmed to operate by multiple inter-communicating software objects rather than a single program and database. These Objects contain both the prime data and the program logic necessary to respond to requests from other objects about their supply capabilities. Objects can be distributed over multiple processors to scale processing capacity to requirements. Objects can be tailored to their specific task. For example, some objects may contain fairly simple scheduling logic while others may use backward chaining inference engines such as expert systems, or historical based reasoning and neural networks to develop and communicate responsive information, comprising data and evaluation thereof, called Rich Responses.

Learning-based:

When the Cube System is first implemented in a plant it appears to be very stupid; that is, it weighs all alternate paths equally. Therefore, it may schedule products on the worst possible machine because it weighs (ranks) the paths through all machines the same. However, as the Cube System operates within the plant and receives prime data, it learns that skilled operators tend to assign certain types of products to certain machines and it adjusts the weighted rankings for those paths and learns to load specific machines with those types of jobs. CUBEBOOKING operates in near real-time so that if one possible process path to accomplish a Job becomes unavailable due to changes in Resources (a tool breaks or materials are late from a vendor) or changes in availability of Workspace (a machine breaks), then the system learns that a skilled operator will select an alternate process path using other Resources, Workspaces, and/or Time. The Cube System will learn these alternative paths, rank them accordingly, and be able to suggest them the next time the previously ranked "best" path is unavailable.

Feature-based:

The top level of the Cube is composed of Feature Objects which define the basic capabilities of the Cube-World. The sum of all these Features define the capabilities of an organization. These Feature Objects constantly query Resource Objects for their capability to supply these Features. When an order is received by the Cube it is decomposed to a series of unitary demands for Features and passed to the Feature Objects via the ObjectBank® messaging communication software of our prior, copending application Ser. No. 07/986,727. The Feature Objects compare the resulting demand to their known supply and return a Rich Response.

Multiple Non-deterministic Alternatives:

Because Cube Objects (the micro-scheduling software objects of the Cube System) are aware of the uncertainty of future events, as explained in the Henderson Uncertainty Principle, all communication of demand and supply between Cube Objects is formatted as a Rich Response which contains multiple paths of alternative processes, each with an attached probability, rather than a single solution. As the assigned Time approaches Now the level of uncertainty and the alternative paths are narrowed until, at Now and continuing into the past, only the single path chosen is displayed with 100% certainty.

Proactive:

Through its display of the Cube, it shifts time to encourage proactive decisions by suggesting that users react Now to future events by selecting from ranked probable alternatives while encouraging intelligent procrastination—decisions which narrow possible alternatives are made as late as possible to provide maximum flexibility.

Extensible:

It is extensible so it can be scaled to handle very simple single work cell organizations or complex multilocation organizations with varying degrees of granularity.

Time-based:

Above all, the Cube System is time-based. Rather than scheduling demand and supply with respect to time, it schedules time with respect to demand and supply.

It should be understood that the Cube System is enabled in hardware, including: computers, including their attendant logic processor and coprocessor circuits configured by the software to perform the described functions; various data transfer links (cables, 1R, RF, optical and microwave transmission means therebetween); data structures including memory therein, containing physical manifestations or transformations (on a molecular or atomic sale) representing data, e.g., as differing states; computer operating and application system programs; expert display, communications and logic programs; display and output devices (monitors, printers, speakers, lights, etc.); and input devices including keyboards, sensors; scanners; cameras, and the like. For example, continuous weighing bins or scanned conveyors have sensors that transform product or raw material weight or numbers into digital signal data that is input to the computer memory to be part of the data structure therein, and then may be searched, selected and transformed by one or more of the programs as output data, in the form of a series of data values or set of data, as part of a Rich Response, a display of information, or result in (effectuate or initialize) further physical operation, e.g., movement of a conveyor, storage of tool bit, print-out of a demand to a vendor or other cube object, transport a partially finished product (work-in-progress, "W.I.P.") from one workspace to another, and the like.

FIG. 1 is a schematic diagram of the apparatus system of this invention. The decision engine of this invention is the CPU 2 of a computer system 1 Communications between the CPU 2 and the other various hardware associated with a computer system 1, such as primary memory 20, secondary memory 30, and random access memory 25, is accomplished by means of a data bus. Communication between the computer system and remote data entry and retrieval sites including user interfaces 10, resource supply areas 40, and equipment, tool and queuing areas 50, is accomplished by a local area communication means such as a local area network 5 (LAN) with the remote areas physically connected thereto and in communication with the LAN 5 by a data transmission medium such as T-base-ten or BNC wiring, 6, or by microwave. Other communication methods, including telephone messages, hand written notes, etc. may be used.

The LAN 5 is connected to a wide area communication means 65 used to communicate with off-site customers and off-site vendors (outside of the cube universe). This wide area communication means may be a T1, T2, or T3 system with either a dedicated line or a microwave link, or it may be a communication service such as Internet® or Compuserve® whereby orders (demands) are made via E-mail, or it may be a direct phone modem hookup between the customer or vendor and the Cube System, or a manual order (demand) entry system such as a telephone, keyboard, punched card, etc., or any combination of the above. When the customer or vendor uses a computer system to place orders or receive demands, a wide area network may be used and these orders or demands may be formatted to communicate directly (electronically) with the Cube System of this invention.

The primary memory 20 may be any non-volatile computer memory including but not limited to hard disks, ROM, EPROM, and non-volatile RAM. Within the primary memory 20 is contained those software instructions that do not change such as the operating system for the computer 2, the CUBE VIEW program 22 and the CUBE BOOKING program 23. The RAM 25 loads these programs during operation to significantly improve computer response time.

Secondary memory 30 contains those data that may change with each new demand or over time. Alternate path history data contains a history of the elements of the best paths used in the past. Based on this history, non-deterministic models may be used in identifying a best path for the present order. Data structures 32 and data sets and arrays 33 contain information as to workspace layouts, supply bin locations, resource availability, and feature capability. These data are updated dynamically (near real time) as conditions in resource and workspace areas change and are communicated via the LAN 5 to the computer 1 and the secondary memory 30. Data entry and retrieval hardware such as bar code readers, parts counters, sensors, manual entry, etc. continuously transmit data from the Resource areas 40 and the workspace areas 50 to the secondary memory 30 so that current data is always available for the Cube programs.

Alternately, data may be communicated to the Cube memory 30 by telephone, or other manual data entry methods.

In operation a customer 60 demand or order 61 is received via the wide area network 65. The order is interpreted or broken down by the CUBE BOOKING program into a set of features required to satisfy the functionalities desired by the customer. The secondary memory 30 is accessed and the current feature capability status is queried to determine if the feature demand may be satisfied. Alternately, the shop floor may be contacted to determine if a feature may be provided. If the feature demand cannot be satisfied a rich response 62 is communicated back to the customer 60 containing a statement of inability to provide the requirements of the feature demand and also providing alternative features which may provide the required functionalities sought.

Concurrent with the Cube System determining that the features can be supplied, the secondary memory 30 is also queried to determine if sufficient resources are available to meet the quantities desired in the demand. Alternately, the resource area of the shop floor may be contacted by telephone or the information retrieved by some other method.

A workspace determination is also made whereby the Cube program calculates a best path. The best path is defined as that selection of particular workspaces which in combination create the process which will most efficiently, effectively provide the features of the demand. Non-deterministic methods including alternate path histories, expert systems and transportation modeling techniques may be used to determine the best path. Variables that will affect the selection of a workspace include statistics (past performance) on yields, process times, floating resources available, existing queues, work in process, workspace availability and downtime rates and physical distance from other workspaces in the best path.

Once the best path has been determined, resources are scheduled in time with the selected workspaces. While resource allocation may be made by a simple comparison of need versus availability at any given workspace, an obvious improvement would utilize standard linear programming methods to accomplish an efficient resource allocation. Further, other Cube Worlds may be queried for resources. However, selecting which remote Cubes to derive resources from will include an analysis of shipping costs and other costs related to transporting resources over a physical distance. Outside vendors 70 may be queried and responded to via lines 72 and 71.

If sufficient resources exist (as determined by the CUBE BOOKING program based on data in the secondary memory or from contacting the shop floor) the customer is informed of the status of his demand 62.

If sufficient resources do not exist to meet the customer's demand, a rich response explaining the resource shortfall as well as a best-can-do production figure for the requested delivery time and a time frame to meet the entire demand is related back to the customer at 62.

Resources are moved to and from the various resource inventory areas 40 by some physical means 45 including conveyor belts, forklifts, trucks, mail service, etc. Processing to provide the requested features may commence when a supply of resources adequate to begin processing has been delivered to the workspace area 50 and in particular to those workspaces 55 associated with the best path. Finished product 80 is shopped to the customer.

The technician may monitor the status of a particular job or project at a user interface 10 which includes a CRT, keyboard, mouse and any other I/O device. The Cube View program 22, previously described, is ideal for monitoring progress at a workspace 55 as well as resource status at that workspace.

Figure 2A:
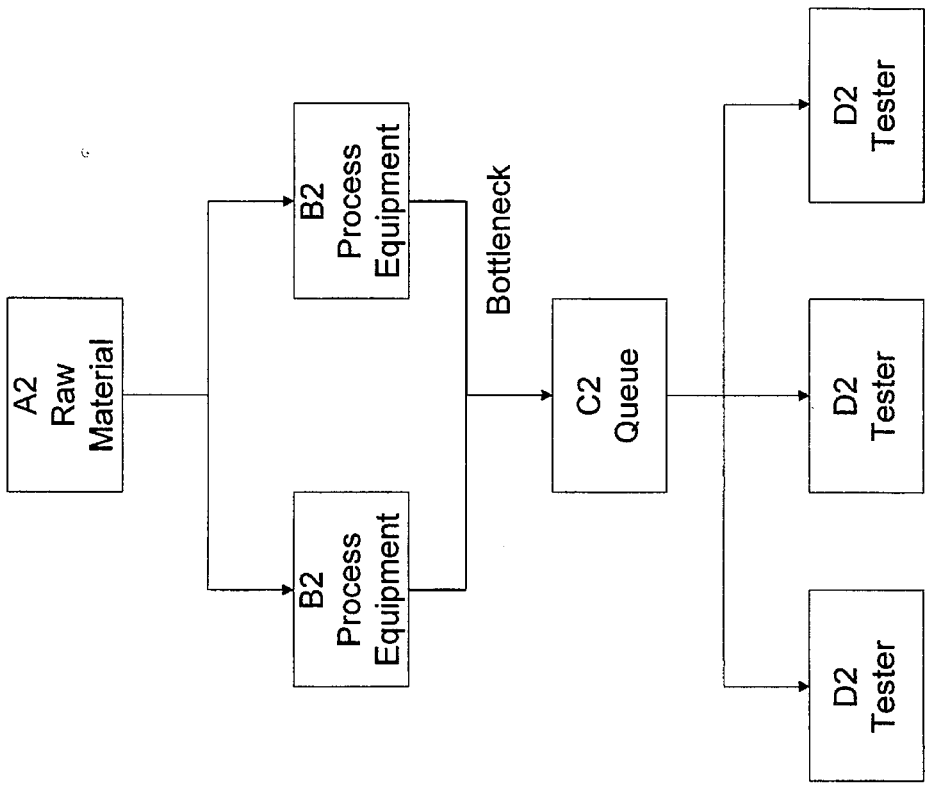
FIG. 2a is a process flow diagram of a traditional linear process line.
Figure 2A:
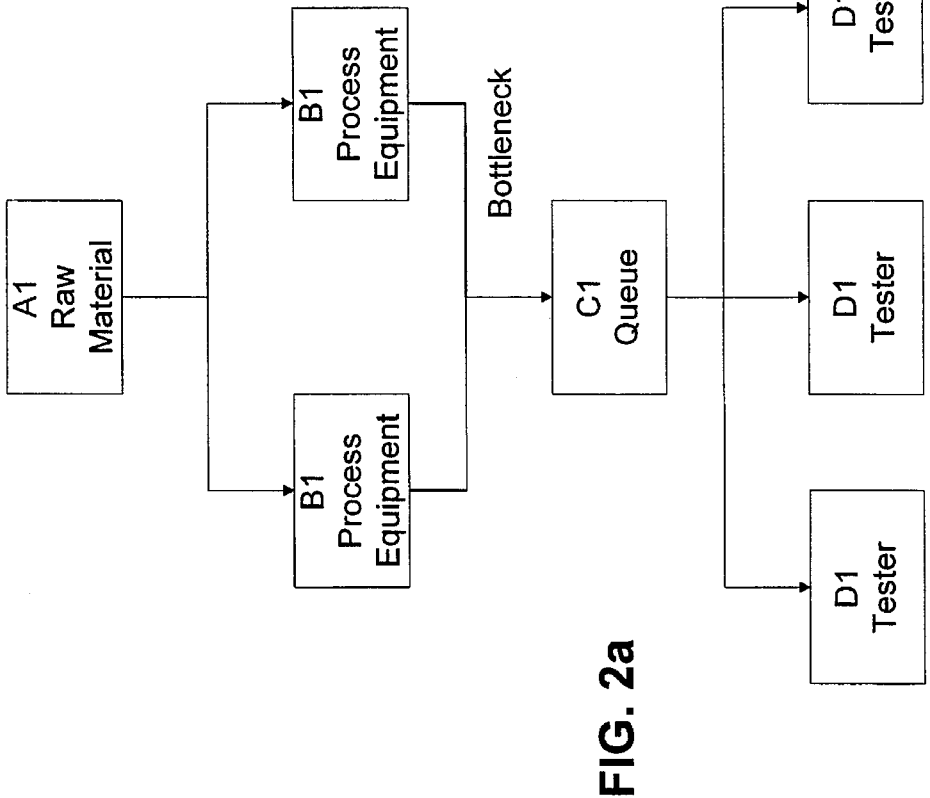

The implementation of a "best path" process requires deviating from the traditional process line structure. FIG. 2a shows a traditional process configured linearly with dedicated workspaces (process equipment, querying areas, etc.) assigned to a particular line. Bottlenecks or availability problems in one process line may result in an interruption or a reduction of flow of product having the desired features.

Floating resources associated with a dedicated process line are generally not available to other process lines. Thus, if a dedication process line experiences work flow constrictions, its resources are generally not available to any other dedicated line so as to allow the other process line to compensate for the reduced throughput.

Figure 2B:
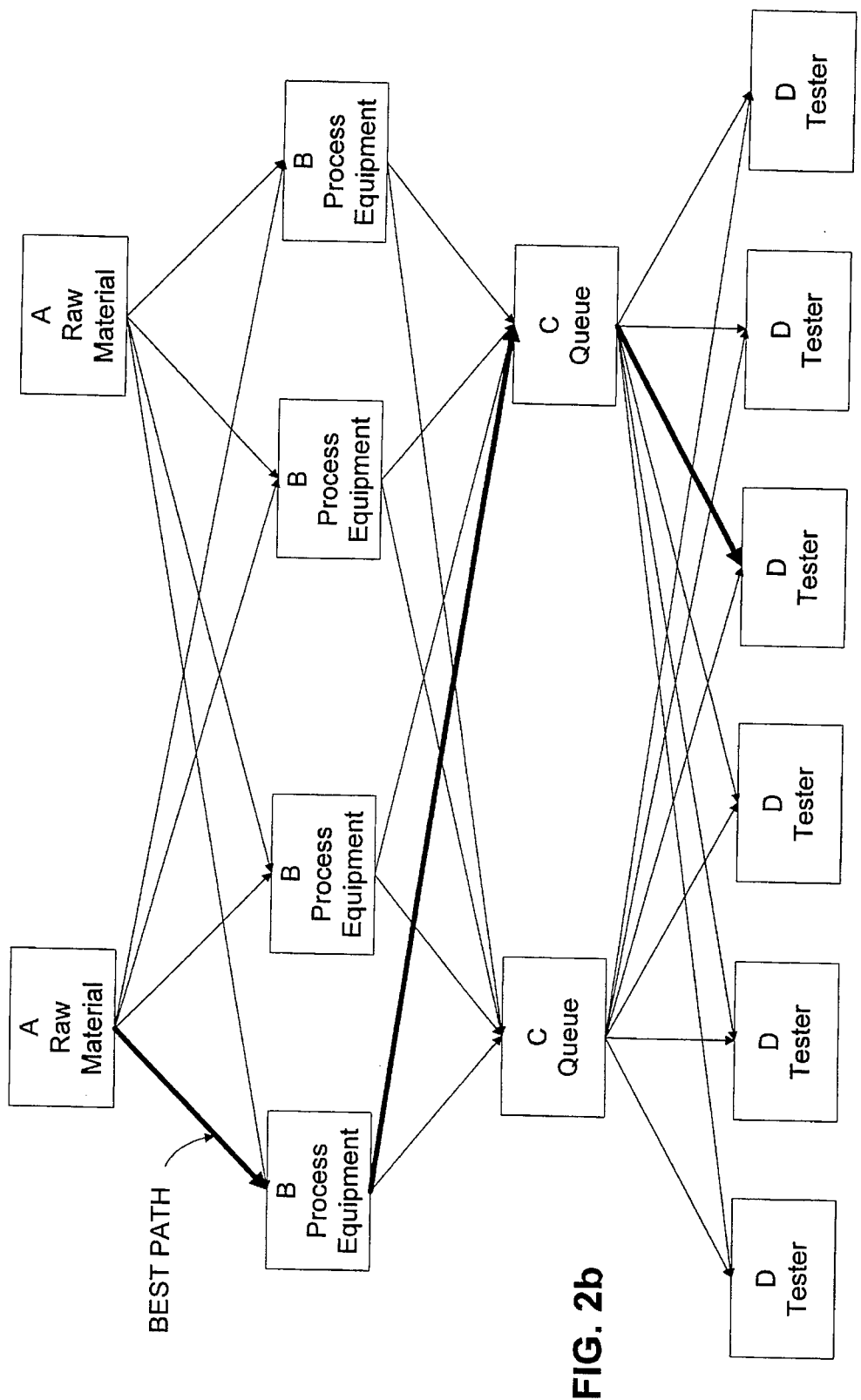
FIG. 2b is a process flow diagram showing a cellular process flow architecture.

FIG. 2b shows a process comprised of cells. Unlike a dedicated process line, the workspaces are not associated with any particular process line but are now available as independent cells any number of which may be called upon to satisfy the demand.

Further, a cellular approach permits selecting a "best path" by which a given demand may be satisfied. The "best path" may be determined by various methods including past alternative paths which have been shown to work, or by "transportation modeling," a linear programming tool which works backwards, from the last set of workspaces, forward to the first set of workspaces.

Each level of cells or workspaces, may be associated with a particular process step which contributes to the features demanded by the customer. All workspaces in a level, however, are not necessarily equivalent to one another in its ability to provide the desired feature. Variances between workspaces in such variables such as existing query, yield, cycle time, raw material availability, labor availability, physical location in the plant, physical distance from resource supply bins, and availability will make the selection of one workstation preferable over another workstation at the same workspace level. Using established modeling tools, the process path best able to meet the demand may be identified.

Cube-World:

An organization provides Products/Services to Customers based on Orders from Customers to deliver certain Products/Services at a certain Time (in the future). These Product/Services may be received from a Vendor or produced by the organization itself using Resources. No matter whether these Products/Services are received or produced, certain Workspaces are utilized during the order-filing process. An organization may be a single location, it may be as large as several plants, offices, warehouses, and vendors, or as small as a single department or machine. While the Customer Orders are considered to be exogenous demands, depending on the organization, such can be considered endogenous, i.e., "inside orders," for example, orders from a parent company to its division or subsidiary, or vice versa, or between subsidiaries or divisions.

The organization is divided into one or more Cube-Worlds, a logical subunit responsible for a defined (selected) product/service resource. Each Cube-World is expandable and contractible along with each of its axes. Each Cube-World is defined to be large enough so that its boundaries encompass all possible alternative Processes to fill orders for its Products/Services. A Cube-World may be part of a larger Cube-World, its "Parent-Cube." It may contain smaller Cube-Worlds, its "Child-Cubes." A Cube-Universe is the set of all intercommunicating Cube-Worlds, perhaps extending beyond the organization to its customers or vendors.

Represented in the Cube System, at one or more of the CubeWorlds and/or Cube-Universe(s) levels, is the When (Time), Where (Workspaces), What (Resources), Why (Orders), and How (Features) of the schedule decision making process.

The Cube Structure:

The Cube System (Cube) structures and displays a three-dimensional representation of Demand and Supply for Resources at Workspaces in Time. It is composed of Cube-Cells, each with a width, depth, and height equal to one unit on each of the axis.

Time Axis: The time Axis can be envisioned as the horizontal (X axis) of the cube. Time is "When" of the Cube System. The present moment in real-time, Now, is Time Zero, $T_0$, and we scroll forward and backward in time along this axis. The time Axis has a number of elements or aspects:

(a) Time Unit: The system has the ability to display Time in variable blocks, from one second blocks to days or weeks at a time;

(b) Time-Cells: A point in the Cube at specific Y and Z coordinates and an X axis width equal to one block of the current Time-Unit. CUBEBOOKING loads one or more Jobs into Time-Cells.

(c) Time-Horizon: This is the length of the Time axis from Now to latest future date; and (d) Time-Slots: CubeCells of equal Time.

Workspace Axis: The Workspace Axis can be envisioned as the vertical (Y axis) of the Cube. This is the "Where" of the Cube system. These are the work centers and storage locations within the Cube-World that will be scheduled, e.g., Tsugami drilling/milling machines, tool bins, warehouses, vendors. The locations of the Workspaces are defined (located in space within the factory) in a three-dimensional coordinate system from a unique triple zero corner adequate for robotic control. When viewed over a long enough Time-Horizon, Workspaces are similar to Resources. The distinction is that within the present Time-Horizon these are Fixed-Resources, and the Cube System will not attempt to change them.

Resource Axis: The Resource Axis can be envisioned as the front-to-back (Z axis) of the Cube. This is the "What" of the Cube System. These are the elements that are combined with each other to make the Product/Service sent to Customers. The User selects which Resources to define the Cube System. Only the Resources so defined will be scheduled by the Cube System. For example, if the user wanted to use the Cube System only for material requirements planning, they would define only material resources to the Cube System. Since the Cube System would not know about other Resources, such as labor and tools, it would not attempt to schedule them.

Order Objects (Orders):

This is the "Why" of the Cube System. Order Objects contain all the Prime Data necessary to act on the order within the Cube. The Cube contains several types of Demand and Supply orders.

Demand-Orders:

(a) Customer-Order: This is a Demand for a Product-Resource from outside the Cube-World, an exogenous order, specifying a certain quantity of a certain product/service for delivery by a certain Time. This may be an order from a customer of the organization or may be an order from another department within the organization that is operating in a different Cube-World (local or distant).

(b) Phantom-Order: When the lead-time specified by a Customer for delivery of a Product may be shorter than the lead-time to produce a Product, the Cube System will maintain and update its own estimate of Demand in order to provide a target to manage the uncertainty of such speculative planning. The Phantom-Order is more than just a quantity and a date; it includes an estimate of the expected standard deviation of order lead-time, so that the Phantom-Order can be adjusted as actual Customer-Orders appear in the system. As normal expected Customer Orders arrive in the Cube they are allocated against the Phantom Order for the same delivery time. As the delivery time approaches Now, the Phantom Order is gradually replaced by Customer Orders until at Time=Now the Phantom Order reduces to zero.

(c) Replenishment-Order: A Demand for a quantity of Purchased-Resource to be ready at a specified future Time from another Cube-World or a vendor. This order is exogenous relative to this Cube-World. It may be communicated to the Vendor using Electronic Data Interfaces (EDI). All Replenishment-Orders can be tied back to the Customer-Order or Phantom Order that created this Demand. A Replenishment Order is a Demand on another Cube-World (within the organization) or the outside world. The Supply counterpart of the Replenishment-Order is called the Replenishment.

(d) Job-Order: A Demand for a quantity of Product-Resources or Component-Resources to be ready at a Time. This order is endogenous to this Cube-World. All Job-Orders can be tied back to the Customer-Order or Phantom-Order that created this Demand. The Supply counterpart of the Job-Order is called the Job.

Supply-Orders:

(a) Job: The Supply counterpart of the Job-Order. A sequence of Processes linked over Time to produce a particular Component-Resource or Feature. It is the Job that is scheduled by the Cube System in order to meet the Demand for Component-Resources placed on the Cube-World by the Job-Order. The Job is the only Supply Order that is entirely controllable within a Cube-World.

(b) Replenishment: The Supply counterpart of the Replenishment-Order.

Feature Objects (Features):

This is the "How" of the Cube System. Features are defined by the Processes that create them.

Process: A Process is the set of steps to create Features or Resources from, typically, existing Resource(s) or Feature(s) at Workspaces over Time. Eventually some of the Resources (Product-Resources) are delivered to Customers. There are a limited number of Processes that can be done within a single Cube-World and they can be predefined and referenced when planning the design or production of a product. In one aspect, a Cube-World can be defined in terms of a process or processes. Each Process has a single primary output and it may have a secondary outputs, i.e., by-products, waste or scrap. There may be alternate Processes using the same or different inputs that will yield the same primary output. Each Process uses Resources and Workspaces. These pre-definitions of Processes define the "doability" within the Cube-World. It should be noted that even waste disposal, e.g., through treatment, can be managed with the Cube System with this view of Processes, Resources and Features.

Figure 4:
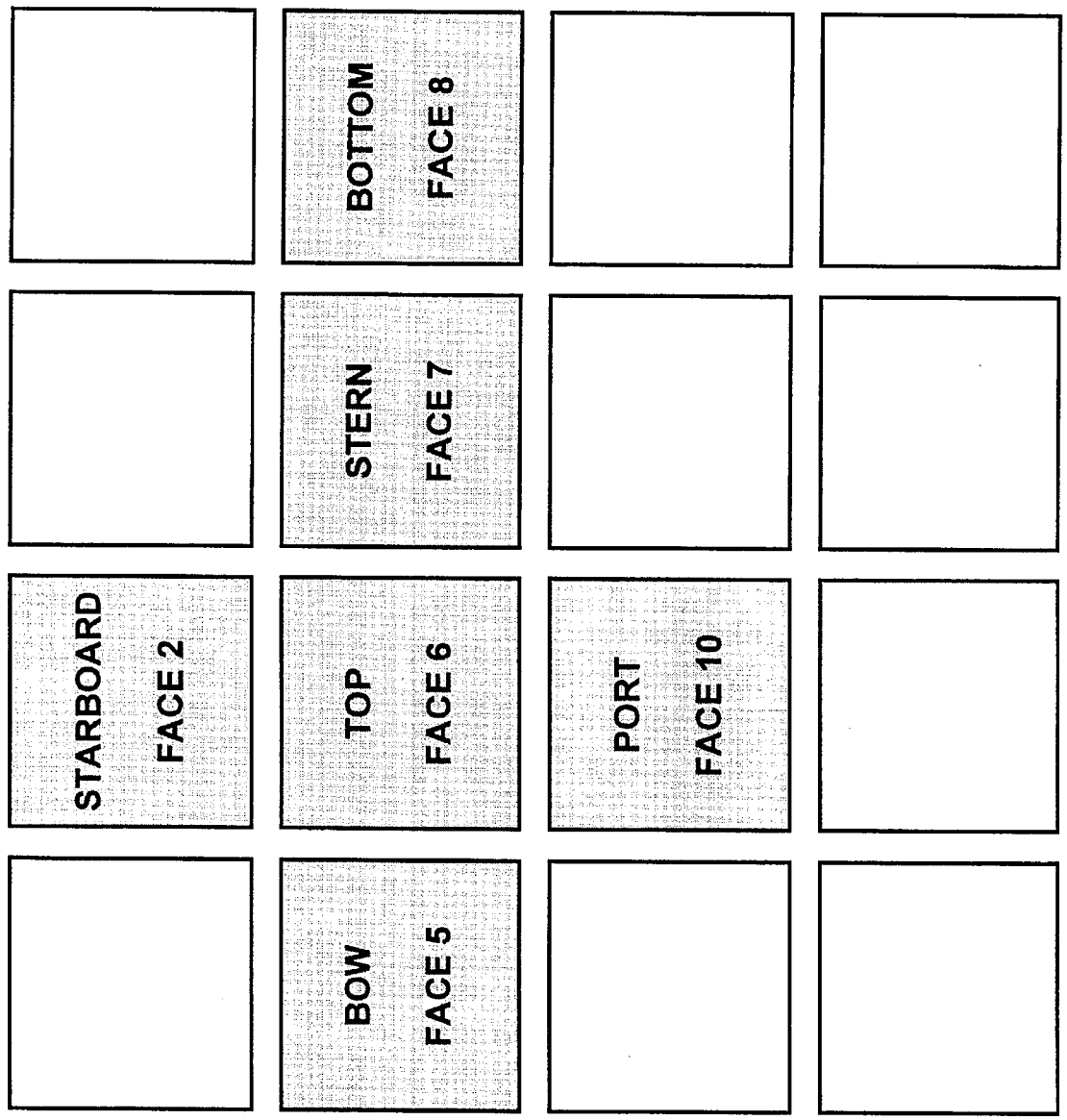
FIG. 4 is a diagram of a negative bill of materials product face reference.
Figure 6:
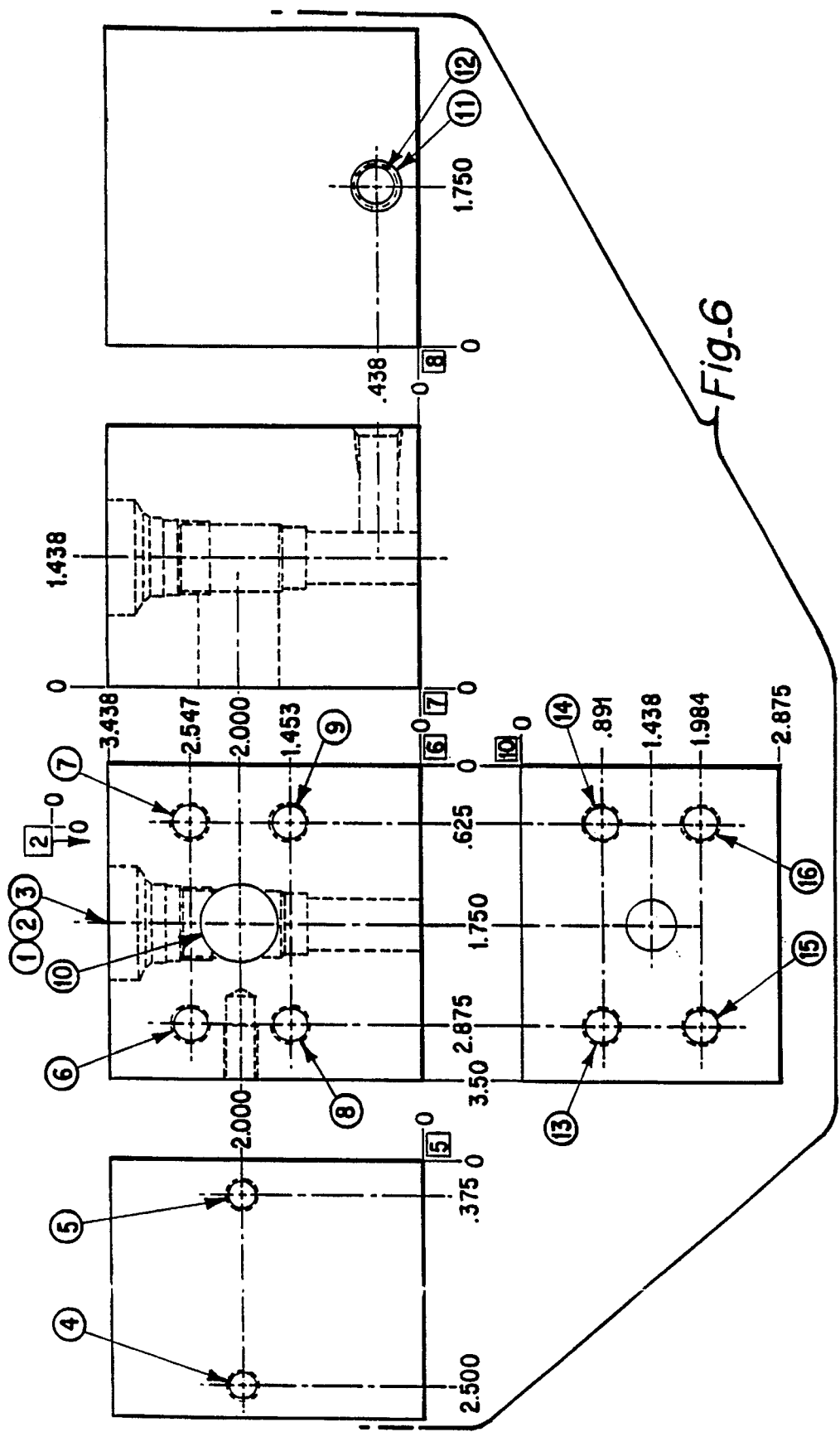
FIG. 6 is a set of plan views of the reference faces of valve body constructed from features defined by a negative bill of materials.

Feature Description: Features are one of the basic building blocks of Products. Once a Feature is defined to the system it can be used in the definition of other Component-Resources or Features. For example, a hydraulic valve comprises a body having cavities in which a cartridge member moves to switch fluid streams. The valve is constructed from a single cube. Each face of the cube is identified by a product face reference (see FIG. 4). This reference permits each face of the cube to have associated with it a negative bill of materials (NBOM). A set of features for each reference face, then, is defined by the NBOM. Appendix A provides an example of the NBOM for the set of features associated with the valve body of this example. The features of the finished valve of this example are shown in FIG. 6. FIG. 6 is a series of plan views, one for each reference face of the cube from which the valve of this example was manufactured. The circled reference numerals correspond to the feature number on the NBOM provided in Appendix A for this valve. Note that for each feature on the NBOM, the coordinates of that feature and other information is also provided. A "T2A Cavity" is a Feature in a valve body that is created by pre-defined steps using the Resource of four specific types of tools and moving those tools in pre-defined sequence of steps at a Workspace called a Tsugami (an automated drilling machine). A Component-Resource for a valve can be defined as being made up of a certain size aluminum body with T2A feature at a certain location, and given a unique part number. See Appendix A. Thus, a partly or completed product or service is itself a Resource for another Cube World, whether endogenous or exogenous.

Feature Concepts: Unlike current conventional Material Requirements Planning systems (MRP Systems), which view products only as a combination of materials and therefore plans only the need for those materials, the Cube System of this invention views products as a combination of Features with many different types of Resources including materials, packaging, tools, fixtures, labor, consumables, production equipment, etc.

By defining the physical "Features" of products rather than fixing the "process" of producing parts, a bridge, a backward chaining way-station, is built in the long path from production machine to product. Features provide automatic flexibility in production processes because Features decouple a product from its production process. See Appendix A, the NBOM System.

When a product is defined to the Cube System, it is defined in terms of its Resources and Features rather than materials and machinery. For example, in making a certain product, it is defined all the way back to its Resources and Workspaces. A component of the product is a certain aluminum body defined as:

Start with a 2×2×1 inch aluminum block and use a 0.25 inch drill which will be located on drill press A to drill a hole through the block at position 1,1,1.

A typical prior art deterministic scheduling system would schedule that job to be run on a certain date at drill press A using a certain drill, an extremely unlikely occurrence!

However, the Cube System defines the product with Features as:

Start with a 2×2×1 inch aluminum block and add a certain Feature called a 0.25 Inch Diameter Hole to a depth of 1.025 inch at position 1,1,1;

and then defines the Feature as a:

A 0.25 Inch Diameter Hole can be made with any 0.25 Inch Diameter Drill provided it is suitable for drilling aluminum and it is long enough to drill to the specified depth.

Further, we know that tools called 0.25 Inch Diameter Drills can be used at many Workspaces called Drill Presses. The Cube System will first examine (e.g., via a query to memory) where all tools called 0.25 Inch Diameter Drills, and are currently qualified for use on Drill Presses then rank the Drill Presses that could be used. Then it groups pending Job-Orders to determine what Features are required at the Workspaces. Finally, Jobs are scheduled at Workspaces already configured, or most easily re-configured, to perform the required Features.

The real power of Features become apparent when skilled operators in the plant are able to develop an improved method to create 0.25 Inch Diameter Holes. They need only add this alternate path to the Cube System as an alternative process to create this Feature. Then all products that use this Feature will automatically have this path available to them. If this new path subsequently is more frequently used than the prior path the Cube System will rank it better, which ranking is recognized as "learned."

The concept of Features avoids the traps described above. Trap #1 is avoided because the Cube System doesn't need to use vast computer power to calculate the "long way" from products to workspaces since the Features provide an "island rest stop" in the middle of this path, and permits looking in both directions. The Cube System Feature Objects constantly calculate in advance all the alternate paths to make all Features at all Workspaces given the supply responses from the Resource and Workspace Objects. When a process is first started (Now) many alternate paths exist and many features are possible. As processing progresses, fewer and fewer process paths and features are available. These are constantly assessed by the Cube programming to ensure that required features are available. The Cube System also calculates in advance the demand for Features based on current orders for Products. As a result, critical real-time scheduling calculations are reduced to the task of comparing the demand for Features with the supply of Features, a function well within the capability of PC's. Trap #2 is avoided because skilled operators can easily introduce new production processes rather than having to use production processes "designed into" the product. The manufacturing facility can be viewed in terms of its capability to produce certain Features rather than its capacity to produce certain products.

Typical Features include mostly irreversible physical transformations of a product done at Workspaces such as drilling, grinding, cutting, welding, heating, cooling, sanding, painting, washing, cooking, mixing, reacting, signal generation or transformation, sensing, etc. It is possible to define a product solely in terms of its Features; even the material is definable in terms of hardness, melting point, etc. so as to provide flexibility even in the materials as long as the product performs as designed. Practically, a product will be defined as a combination of its material resources normally contained in a Positive Bill of Materials (PBOM) and its Features normally contained in a Negative Bill of Materials (NBOM). See Appendix A. Because of the power of Features, it is an important aspect of the invention to use Features whenever possible in defining a product. Together the + and − BOMS make a complete BOM.

Resource Objects (Resources):

Examples of Resources include raw materials, Features, packaging, tools, fixtures, labor, consumables, production equipment, and, for example in the case of valve manufacturing cooling oil for the Tsugami or CNC milling machine. The Cube System can analyze the varying Demand for Resources and indicate the need for changes in the Supply of Resources within certain limitations. There are several types of Resources:

(a) Floating-Resources: These are the Resources that the Cube System attempts to muster at the Workspaces. It tracks availability of these Resources, creates Demand for these Resources based on the Features and Process(es), and recommends changes in the Supply of these Resources.

(b) Component-Resources: These are traditionally called subassemblies or components. That is, they are created from other Resources, although they may be purchased from a vendor or sold to a customer. In the valve manufacture example above, they include: cut blocks, drilled blocks, and T2A cavities. Each Cube-World creates Job-Demands and schedules for Jobs for its Component-Resources completely within its own Cube-World.

(c) Product-Resources: Because Products may be "sold" at different stages of the manufacturing process (e.g., spare parts, subassemblies, components) or be used to make other Products, Products can also be thought of as Resources. Each Cube-World can change the Supply of its Products, but it cannot change the Demand for its Products. However, it can communicate a need for changes in Demand along with alternative Supply strategies to other Cube-Worlds or to its Customers.

(d) Purchased-Resources: These are the Resources which are purchased from outside this Cube-World. Each Cube-World creates Demand for these Resources but cannot change the Supply. However, it can communicate a need for changes in Supply along with alternative Demand strategies to other Cube-Worlds or to its vendors. One of the most common types of Purchased-Resources are Material-Resources or Materials. Continuing with the valve example above, typical Purchased-Resources are bar stock, labor, o-rings, lubricants, packaging materials, tubing, etc. These are the lowest level of the traditional bill-of-material.

(e) Fixed-Resources: These are Resources whose Supply, within the current Time-Horizon, will not be assumed to be changeable by the Cube System. One of the important types of Fixed-Resources is Workspaces.

The availability of resources is continuously assessed. Prior to commencing production, resources available at all workspaces may be scarce. However, as processing progresses, resources are required for fewer remaining features thus generally resulting in resources becoming more available as the processing nears completion.

Cube System Views:

The initial view of a particular Cube World, presented by the CUBEVIEW Program, is the X,Y view with Time on the horizontal (X) axis and Workspaces on the vertical (Y) axis. The initial, X,Y plane is the Z Resource axis=0. This plane displays overall Resource Contentions for that Cube World for the Time Cells in the field (on screen). The Time-Cells display the Jobs that have been loaded at these Workspaces at these Times. The Cube System has already determined (calculated) any Resource Contentions where the Demand for the Resource at this Workspace and Time exceeds the Supply. Those Jobs that have Resource Contentions that would prevent the job from starting will be displayed in red. If no jobs are displayed in red then there are no contentions requiring user intervention CUBEBOOKING has been able to load the Jobs in Time-Cells that avoid all contentions. However, if Job is displayed in red, the user will rotate the Cube to examine the Z,Y view, with Resources now on the horizontal axis and Workspaces still on the vertical (Y) axis. The initial Z,Y plane displayed is Time (the X axis)=0. This view shows where Resources are located at the starting Time. If there are any Time-Cells with Resource Contentions in the Cube the Workspace-Cells on this plane will be displayed in red. Using this view, the user will attempt to relocate Resources to other Workspaces to eliminate any Resource Contentions. In discussing rotating the Cube, it is better to consider that the user (viewer) rotates with respect to the fixed-in-space Cube than rotating the Cube, but some users may conceptually feel more comfortable and be better informed to consider the Cube is rotated around the vertical (Y) axis so the Z,Y plane appears where the X,Y plane was initially on the screen. Some graphics programs can display all three axes simultaneously with "see-through" (e.g., wireframe or transparency overlay) capability.

Blending and Blurring:

With in the three-dimensional representation of the Cube-World it is possible to blend and blur the view of any axis in order to examine groupings. For example, Resources can be grouped into all Drills or all Tools and the Cube System will display these groupings and highlight if there are any contentions within a group. Workspaces can be grouped to show the Demand and Supply for a whole department rather than individual machines. Time-Cells may be grouped to show Demand and Supply for a day or week. Note that Blurring refers to always retaining the detail of each individual member of the group but displaying a representation of the Demand and Supply for that group. The user can alter the Blurring at any time.

The Cube Processing:

Demand vs. Supply: The Cube System makes important distinctions between Demand and Supply. Every Resource within the Cube System has a separate Demand and Supply at each CubeCell. The Cube System attempts to balance Supply with Demand in that CubeCell while considering alternate paths. If it is impossible to fulfill a Demand by the Time requested, the system which initiated the Demand will be notified with a Rich Response which includes the Supply-weighted alternate options that are possible, so the tentative delivery dates and quantities may be re-negotiated.

Three separate processes operate asynchronously. The Feature Supply Process is initiated at every change in Supply and Time. It uses Feature Objects which query Resource Objects to determine the Supply of Features over Time. The Feature Demand Process is initiated at every change in Demand and Time. It decomposes Order Objects to unitary demand for Features. The Negotiation Process ranks alternate probable strategies to balance Supply and Demand.

(a) Feature Supply Process: The Cube System Feature Objects query (typically via network or data bus) the Resource Objects to determine, based on resource supply, their capacity (capability) to create Features. (By query, we mean a request in a specified, order object, format, with an expected reply of Rich Response nature.) At the present time all Resources that are available within the Cube-World are allocated to certain Workspaces (although this Workspace may just be storage or vendor). The Cube System determines (calculates) the ranks for the production of all possible Component-Resources at all possible Workspaces based on the present and projected Resource allocations and retains data in memory on the inter-dependency of these Feature supplies.

(b) Feature Demand Process: The CUBEBOOKING Program reviews the Customer-Orders and decomposes them to unitary Job-Orders and demand for Features. Then the system passes this demand to the Feature Objects. Then the system loads the Workspaces with Jobs in CubeCells, thereby making appointments for the Resources and Workspaces, based on the best rank calculated by the availability of all Resources to accomplish the Job. It warns of potential contentions between Workspace, Resources, and Time. It examines all possible alternate paths and ranks them based on desirability weights. These desirability weights may be arbitrarily assigned by the user but usually will be learned by the system as history patterns, retained as Prime Data, are recognized by a neural network built into Cube Objects.

(c) Negotiation Process: When the Cube System receives a Customer-Order for delivery of certain Product-Resources at a certain Time it attempts to muster available Resources at certain Workspaces to complete a Job to produce these Product-Resources in the "best" manner as defined by a scoring system which takes into account costs, customer service, and "hassle factor." With the desired output known it is possible to rank all the alternate paths to reach that output and determine the "best path." Note that this path may not be the "optimum" path as measured by an industrial engineer but it is the path with the highest rank found using a scoring system as defined by the user (current scoring system). As input factors change, the paths can be re-ranked and the "best" path may change. The Cube-View program shows and attempts to resolve conflict between capacity-limited resources, both within this Cube-World and between Cube-Worlds within this Cube-Universe. The program predicts problems with scarce Resources. Finally, the program displays a "Good morning, Monica" report at any time showing potential problems.

The Customer-Order may cascade through all the Cube-Worlds in an organization. The pull-through demands are placed against each successive Cube-World by the Cube System based on that Cube-World's ability to meet the Demand with its Supply. For example, if the proper Supply of the Product is not waiting (available) in the Shipping Department, the Shipment Department's Cube System will place a Demand against the Assembly Department's Cube System. The Assembly Department's Cube System will review these Demands and create Job-Orders to supply those Demands. If the Assembly Department's Cube System has insufficient quantities of the Resources that it needs to complete these Job-Orders, it will place Demands against the Cartridge (cartridge) and Body Departments' Cube System, etc. Then each Cube-World will attempt to balance these Demands with its Supply through Cube-Analysis. If the Demand cannot be Supplied as requested then the Cube System sends a Rich Response back to the requesting system with the alternate, weighted Supply strategies. The requesting Cube-World has the opportunity to adjust its Demand. Demands can only be changed by the Cube System's Supply strategy. Therefore, these Demands may "cascade" back through other Cube-Worlds, eventually to the Customer Order department so the Customer can be contacted about an adjustment in the shipping date or quantities. It is through this process that an organization establishes credibility with its customers and builds long term relationships.

Figure 5:
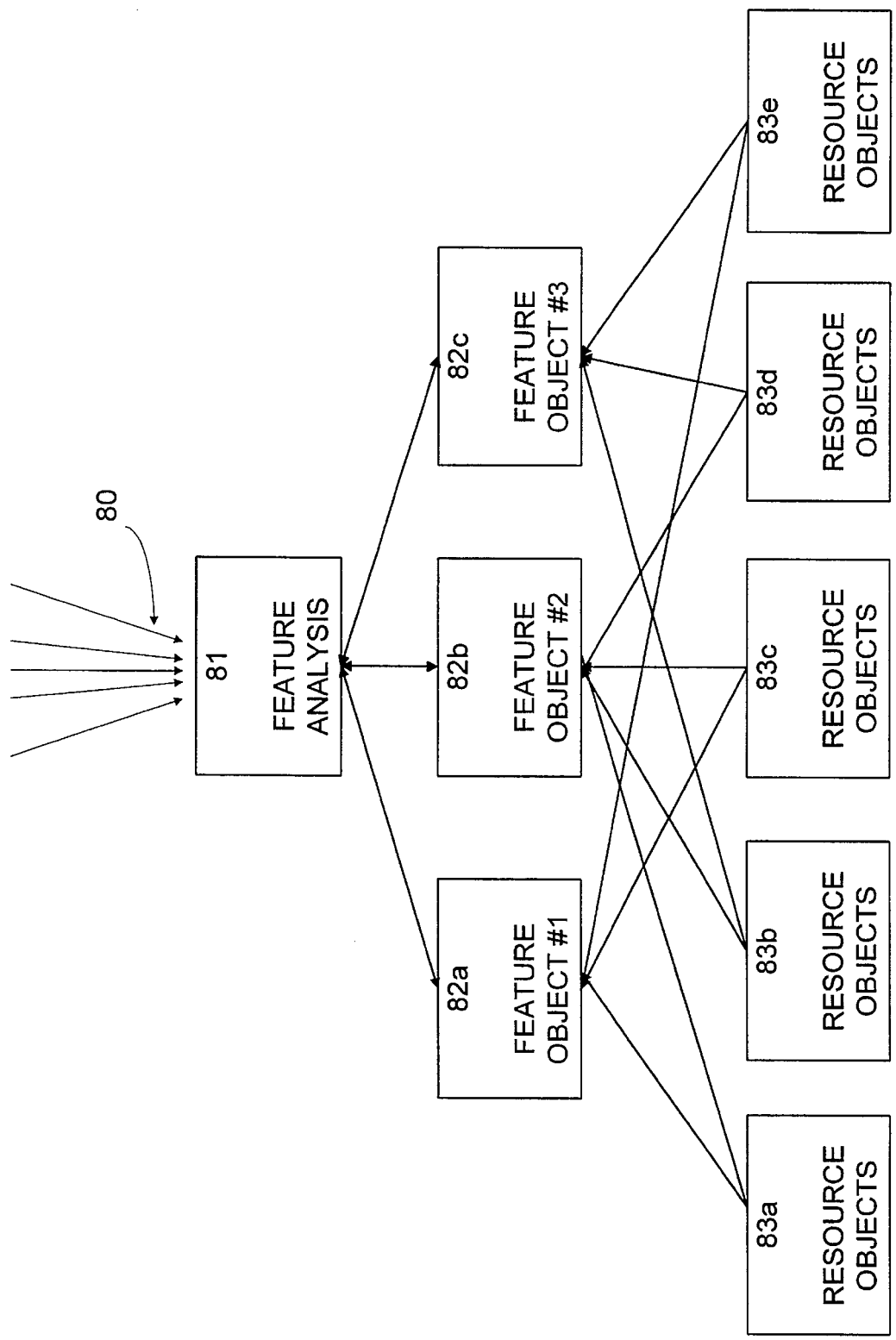
FIG. 5 is a diagram showing the Demand-Supply process.

The diagram in FIG. 5 summarizes the Demand-Supply process as mediated by the Negotiation process. Order Objects enter the Cube System where they are decomposed into unitary Job Orders and Feature Demands, and then passed to Feature Objects. The Feature Objects have already determined their supply capability by querying Resource Objects. The Negotiation Process attempts to balance Feature Supply and Demand in a non-deterministic manner by scoring alternate paths to muster Resource and Workspaces at points in Time.

Intra-Cube Balancing:

Within the Cube-World, the Cube System schedules both the Demand and Supply for its Component-Resources. It creates Job-Orders as demand for its Component-Resources and schedules Jobs to produce Component-Resources.

Inter-Cube Balancing:

Each Cube-World receives Customer-Orders as Demand for its Product-Resources from other Cubes or other interfaced computer systems. Each Cube-World sends Replenishment-Orders to other Cubes or even other types of interfaced computer systems to recommend a change in the Supply of its Purchased-Resources.

Resource Supply Limits:

The Cube System attempts to operate within the current Supply of all required Resources. When a Job-Order cannot be completed by the required Time using available Resources the system will highlight this Resource contention. When analyzing the alternate paths to complete a Job, some of the paths may require additional quantities of certain Resources. Since the Cube System can query the capacity limits of each Resource Object and learn what it takes to get more of these Resources, it can adjust the relative rank for alternate paths. For example, manpower gets more expensive after 40 hours per week. Therefore, any path which uses this much manpower will have a poorer rank than the paths which accomplish all Jobs within a normal work week. If a path utilizes all Tsugami machines full-time, then the marginal cost of more capacity is the cost of another machine. This would result in a very poor rank due to the high marginal cost. Ranks may also differ by lead-time since costs may differ by lead-time. Material can cost much more if delivery must be expedited. As the Time-Horizon is extended to cover farther into the future, certain Resources can change from Fixed-Resources to Floating-Resources, usually for a certain cost and with a certain lead-time. For example, with a large enough Time-Horizon the Cube System could attempt to add additional plants to meet long-term demand.

The logic flow diagram for the Cube system is shown in FIGS. 3a–j. A brief description of each of the pseudo codes is found in Appendix B. FIG. 3 is an overview of the Cube initialization steps 1–10. A customer order or demand 1 is received by the cube system. The demand may be an order from an enduser for finished goods, an order from another system for unfinished goods or a service.

A job object is created in step 1. This step logs the order, determines when the order is due, compares the item requested with the current design level for that item, and if able to supply from a current design, it notes which processes are required to produce the item.

The next step in the initialization process is Initialize Feature Object 3. The associated subroutines are shown in FIG. 3b. Here, the requested item is defined in terms of the features that characterize the item and these features are noted by the Cube system in Set Feature Object 1D 301. The subjective description of the feature as well as the parameters that characterize that feature (dimensional information such as bore hole size and location, compositional data, etc.) is retrieved 302. Production requirements are determined and special characteristics of the item are noted in 303.

Figure 3A:
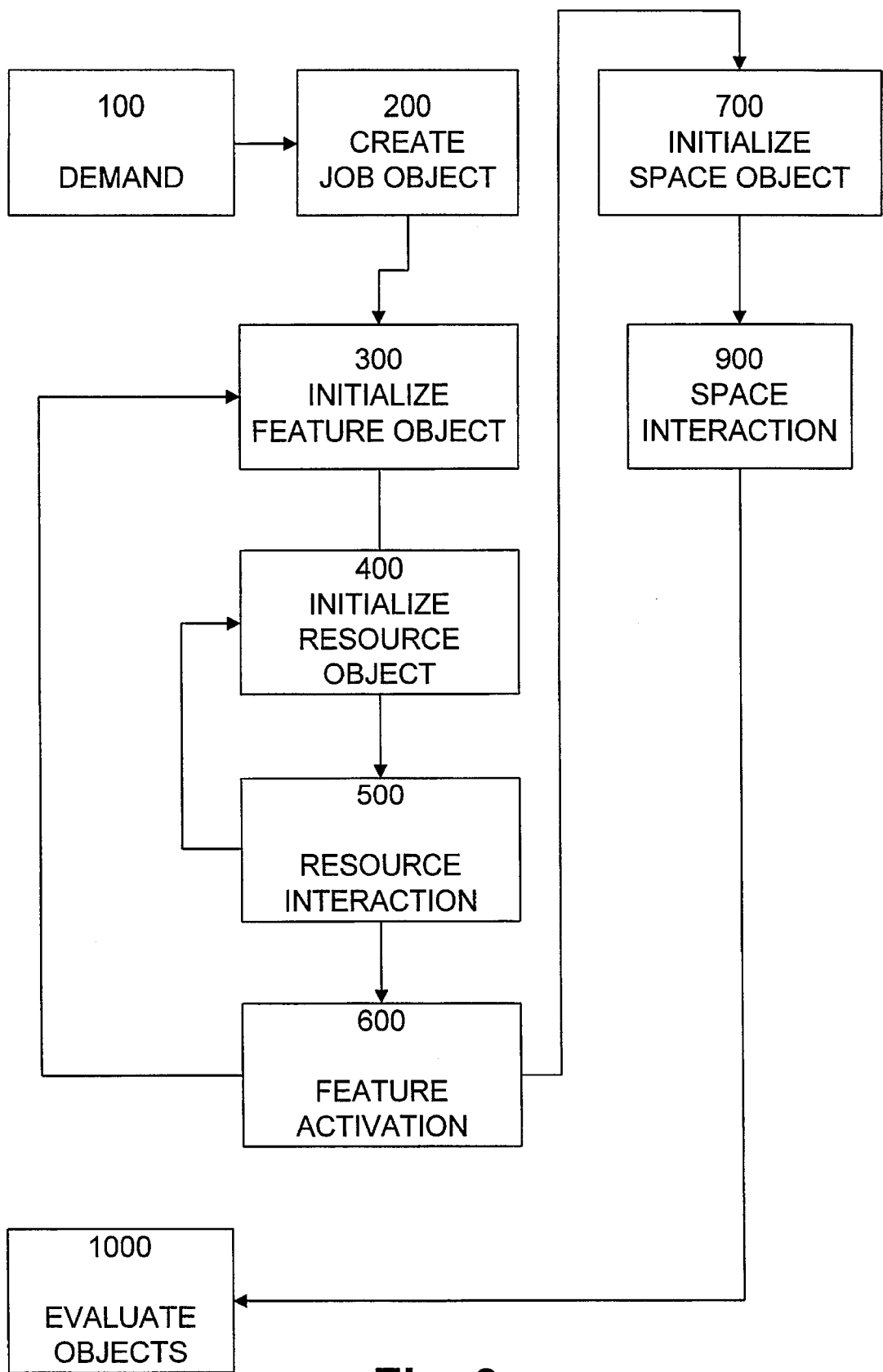
FIG. 3a–j is a logic flow diagram of the Cube System program.
Figure 3B:
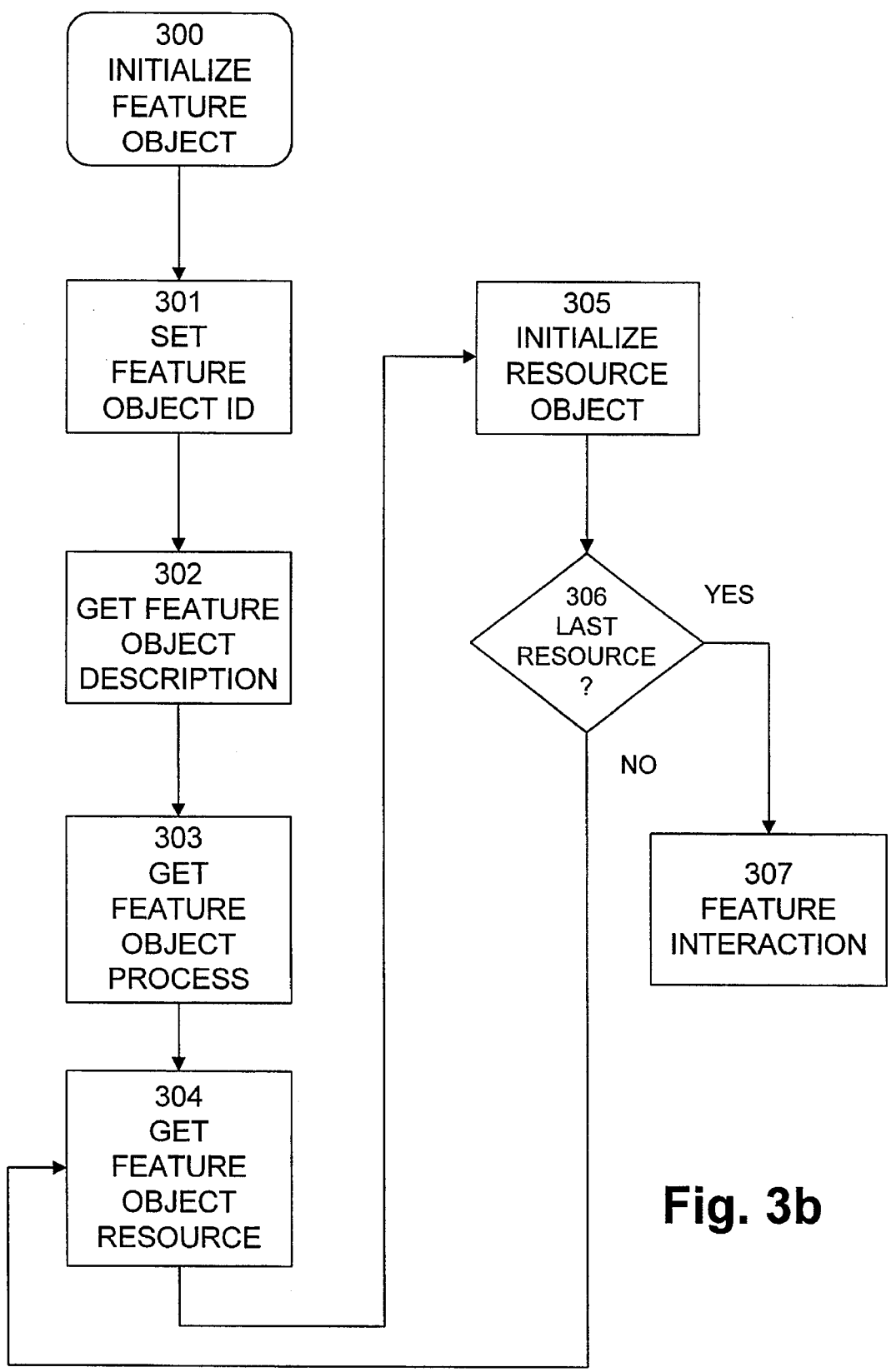
Figure 3C:
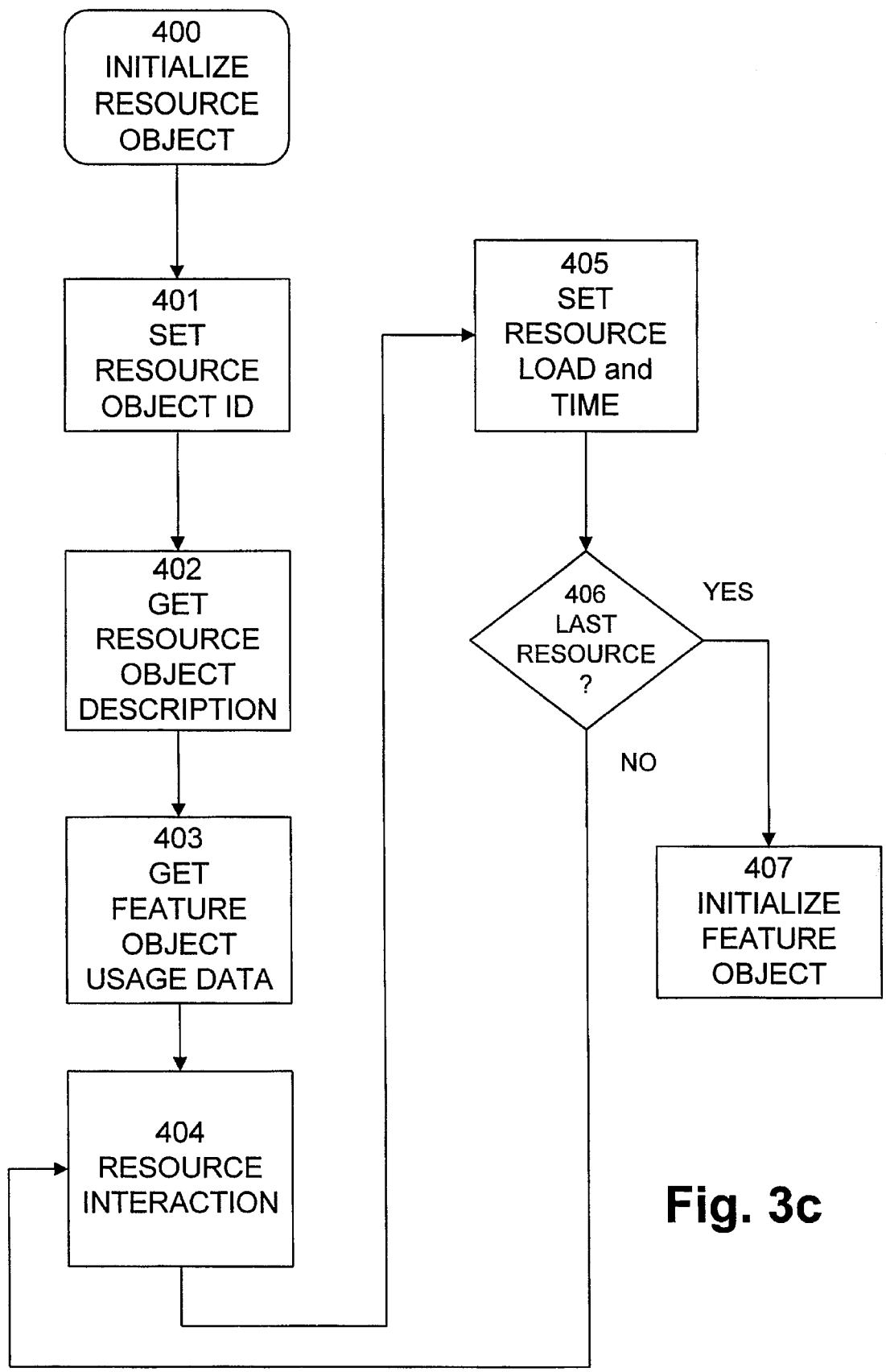
Figure 3D:
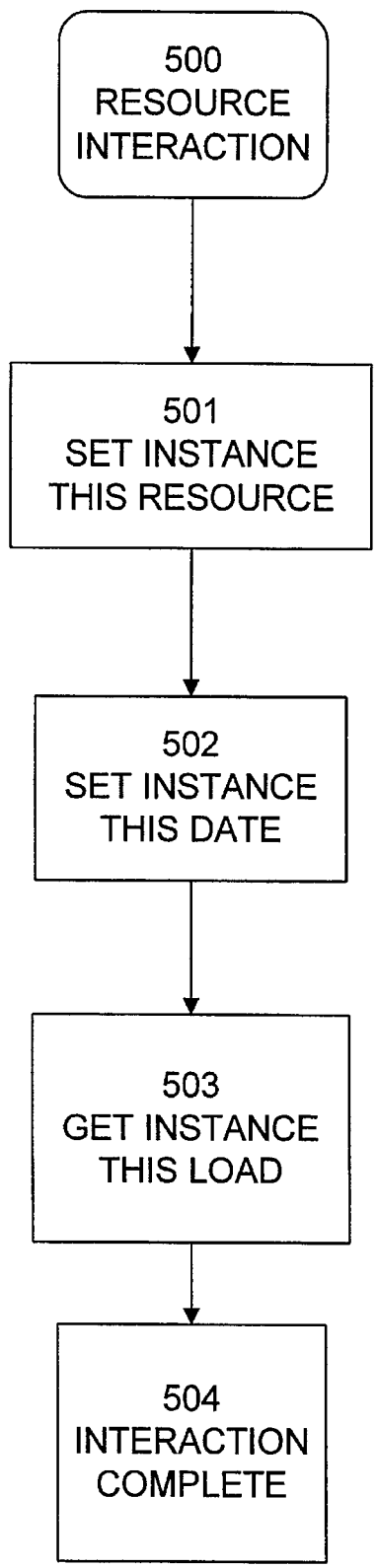
Figure 3E:
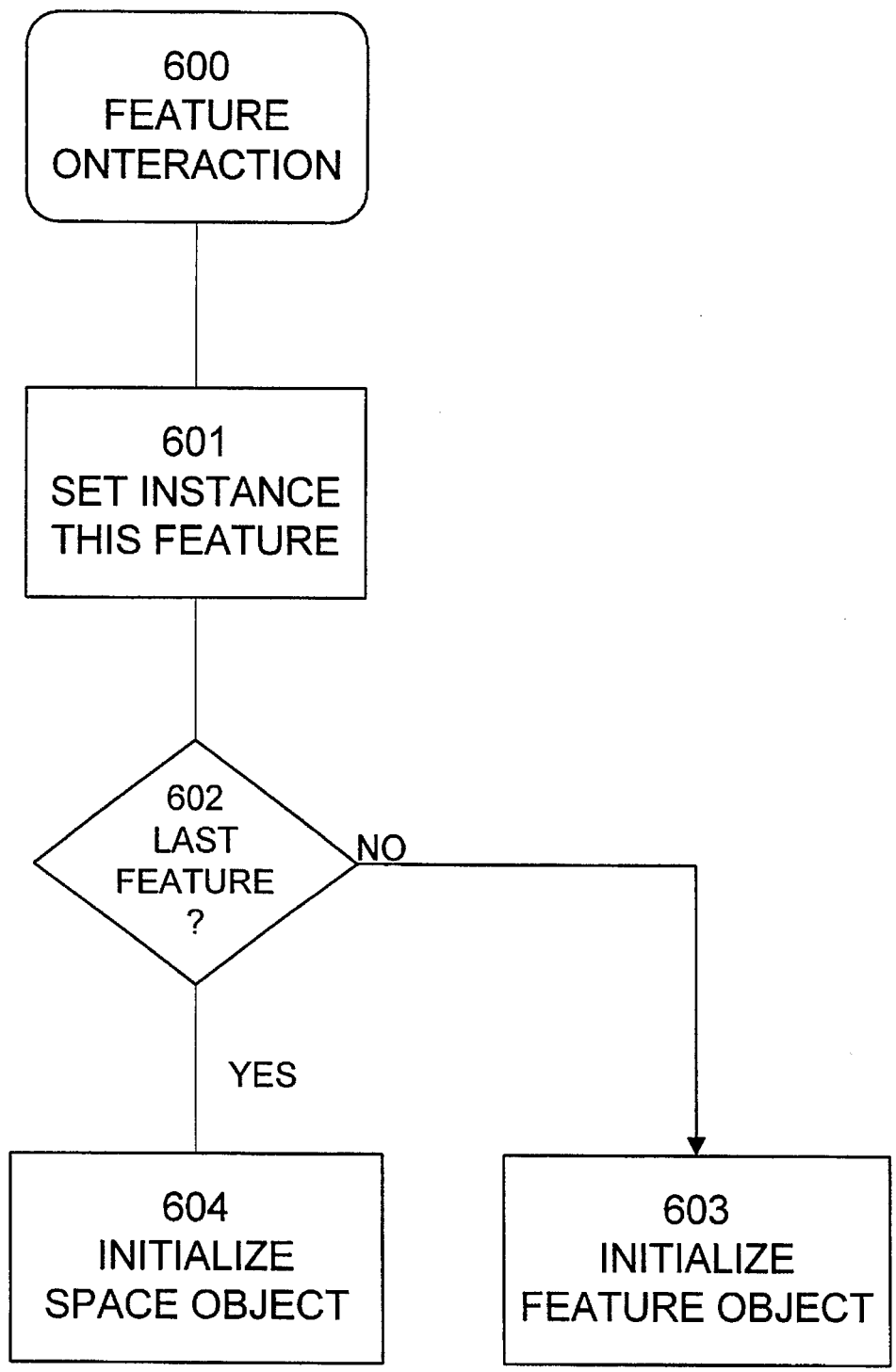

The resources required to provide each feature are determined in Step 4 of FIG. 3a and detailed in FIG. 3c. The resources required to provide each feature are identified 401 and a description and supply level for each resource is determined 402. As each resources for each feature are determined, resource usage tables are set up 403. Resources that have been identified are scheduled and reserved for the production of the associated feature for the project 404 (detailed in FIG. 3d) and 405. Once the last resource has been identified 406, the program returns to 407 (step 3 in FIG. 3a) where the resource initialization process is repeated for each feature until all features have been provided for. As each feature is processed and resources for each feature identified, the data is stored and each feature is flagged as activated. Step 6 in FIG. 3a and detailed in FIG. 3c. If a particular feature is not available or there are insufficient resources to meet the demand, a rich response is communicated back to the customer.

Information regarding the ability to provide the features requested and regarding the resources required to produce these features may reside in the data base of the Cube computer system or may be provided to the Cube system exogenously (e.g., e-mail from the supply room clerk).

Figure 3F:
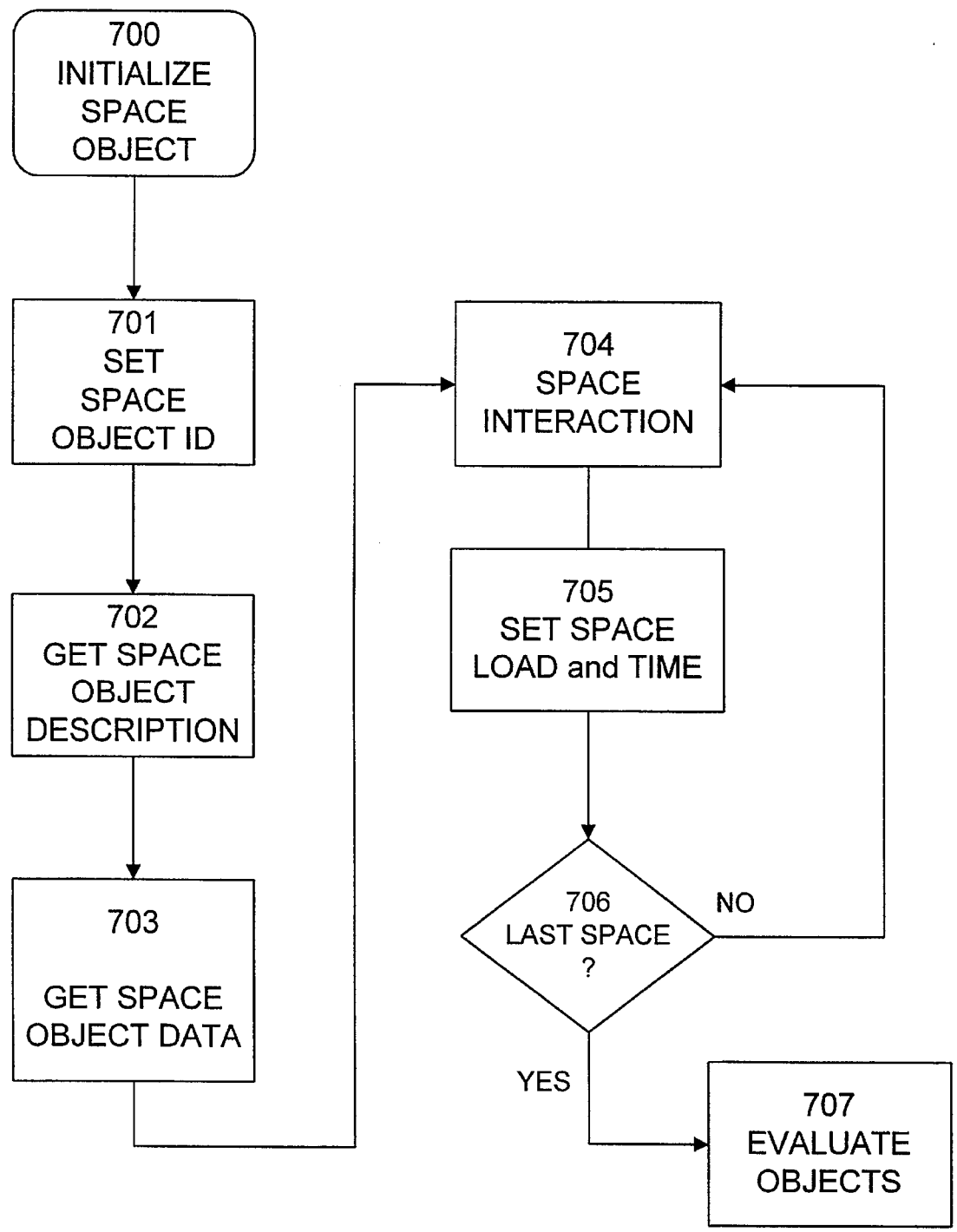
Figure 3G:
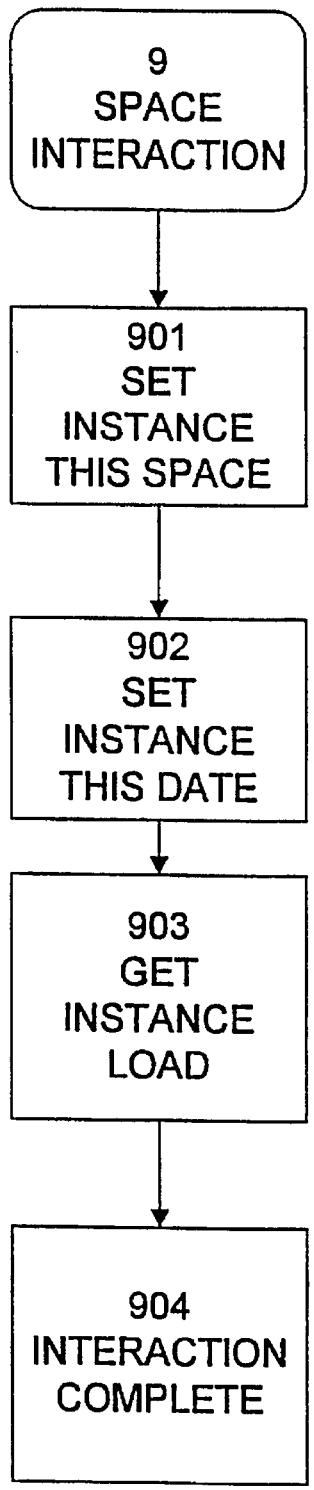
Figure 3H:
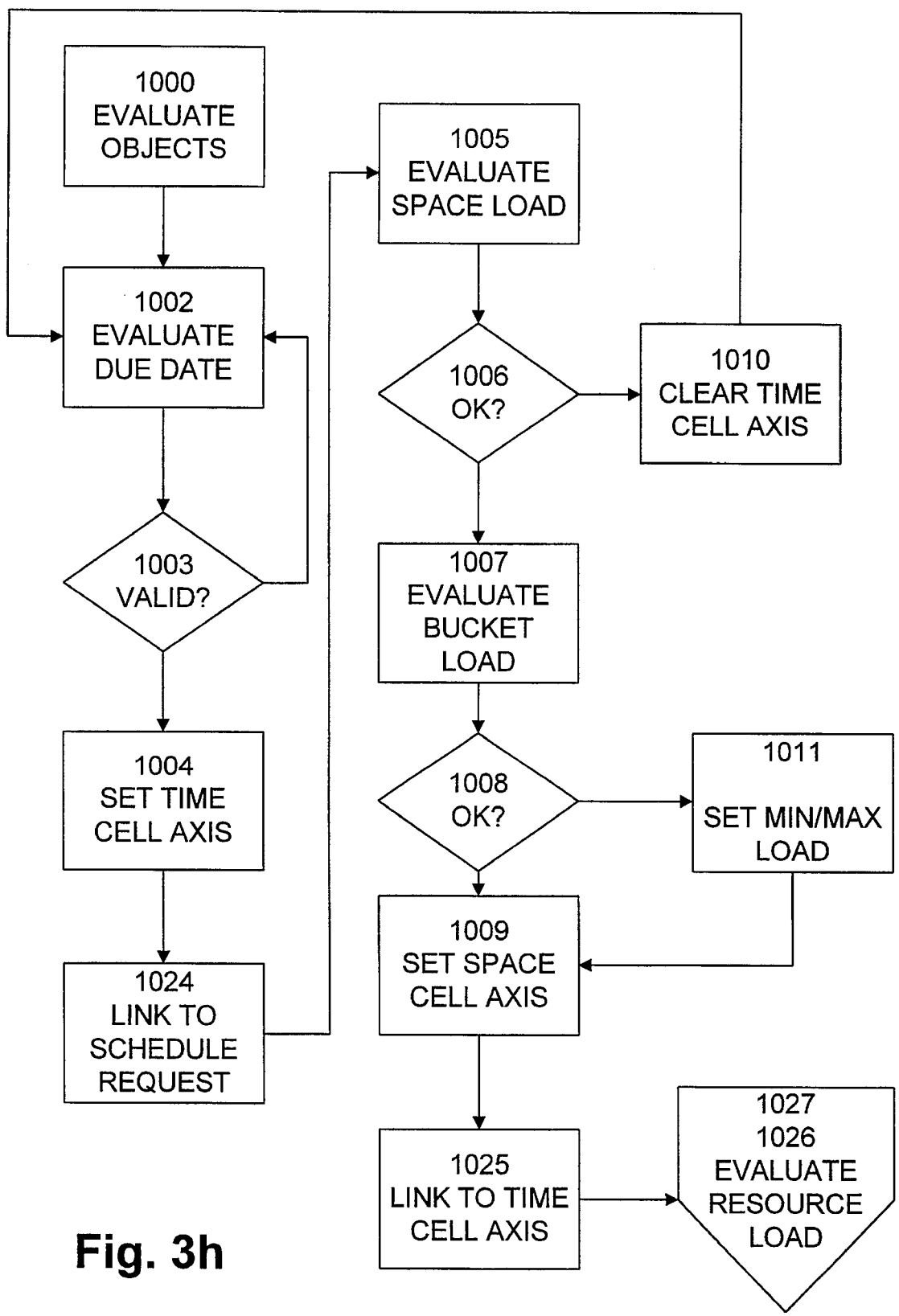
Figure 3I:
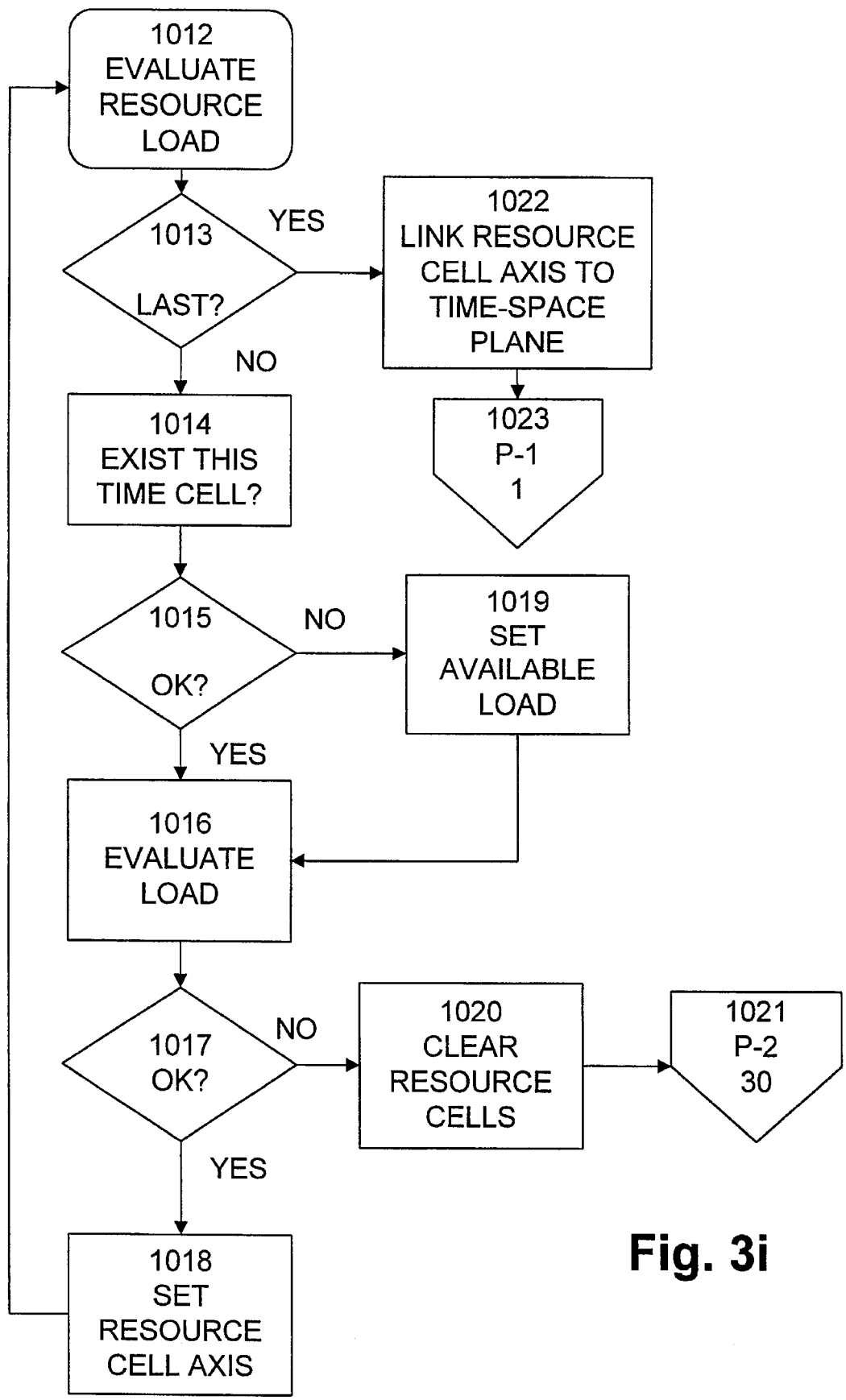
Figure 3J:
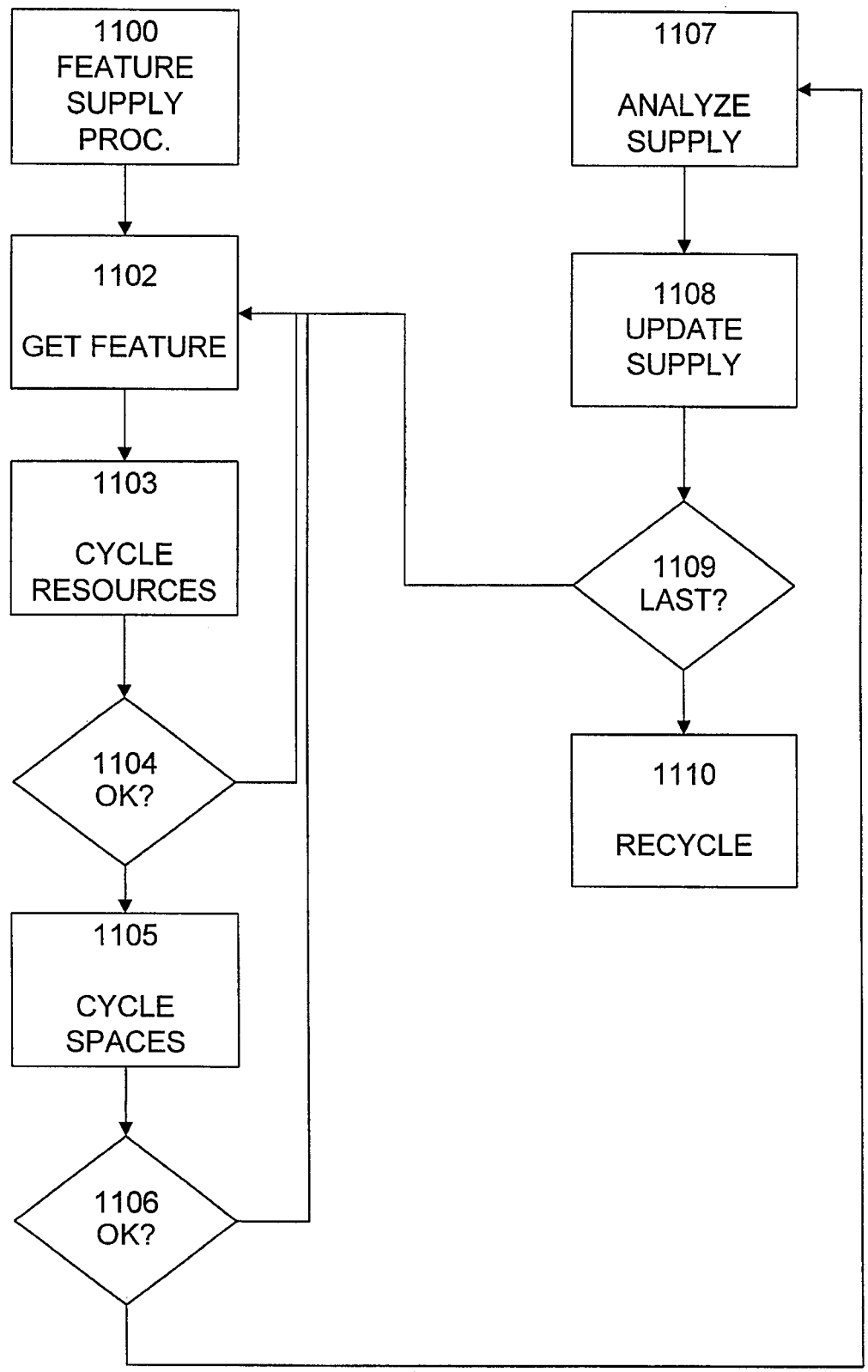

Once the last feature has been processed (step 306 in FIG. 3b), the particular workspace (process machine, storage areas, etc.) is initialized at step 7 in FIG. 3a and detailed in FIG. 3f.

In FIG. 3f the workspaces to provide the features are identified 701 and a description and availability data retrieved 702. As data for each workspace is accumulated, a workspace usage table is set up 703 and each workspace is scheduled 704 (details in FIG. 3g) and 705 and noted in the usage table. Once the last workspace has been identified, scheduled and written into the usage table 706, all of the feature, resource and space requirements are evaluated 707 (and 10 in FIG. 3a) to determine if the demand can be filled and if it can be filled on time. This evaluation process is detailed in FIG. 3h. The due date or the defined time is evaluated 1002 to determine if the order can be filled on time 1003. If it cannot be filled on time, a new due date is calculated and communicated back to the customer as a rich response. If the due date is valid, the CUBE VIEW sets up the time axis with the begin date and finish date 1004 and links 1024 these dates to a schedule plan that will request the required workspaces 1005 needed to complete the order based on the timed need. If a workspace is not available, the time axis is cleared 1010 and the due date recalculated and re-evaluated 1002. If any workspace is not fully available on the requested date a min/max load for that workspace is determined (best guess estimate based on available time and throughput rates) 1011. CUBE VIEW then sets the availability for each workspace on the space cell axis 1009 and links it to the time cell axis 1025.

The resource load is evaluated 1027 after the space cells and time cells have been linked. This process is detailed in FIG. 3i. This procedure includes the steps of determining if the resource is available when it is needed 1012 and 1013. If it is not fully available when needed, the amount of available resource is noted 1019 and evaluated 1016 to determine if production can proceed with at available amount 1017. If the resource available is insufficient to commence production at that time, a rich response is communicated to the customer providing alternate proposed quantities of product and schedules. If the resource availability is satisfactory, that resource for that workspace at the time is set on the resource axis of the Cube View program and linked to the workspace and time space.

The above steps complete the initialization procedure. Once product has commenced, the CUBEBOOKING program continues to evaluate, in near real time, the availability of features that remain to be provided (see step 11 in FIG. 3j).

Each remaining feature is continuously evaluated and the workspace corresponding to those features constantly updated 1105. As production proceeds, workstation selection may change with alternate process paths chosen based on changing historical data associated with a workspace, sudden contingencies, a new best path is discovered or for any number of reasons.

Resources are also constantly being monitored 1103 and 1104 to identify changes in their availability.

The constant updating of the supply of features, workspaces and resources ensures that production will proceed with a maximum likelihood of meeting the demand and with a minimum amount of downtime. Variances in the planned features, workspaces and resources are analyzed 1107 and quantities and schedules updated 1108. An example of pseudo code that can be used for the Cube System of this invention is provided in Appendix B.

It should be understood that various modifications within the scope of this invention can be made by one of ordinary skill in the art without departing from the spirit thereof. For example, advances in computer technology will undoubtedly improve the speed, reliability, memory capacity and user-friendliness of the general purpose computers used as the hardware component of the Cube System. For example, personal computers that now use Intel Pentium microprocessors and Microsoft Windows 95 operating system software will in the future use much faster microprocessors and more user-friendly operating systems. General purpose computer components of the Cube System can employ multiple central processing units, advanced speech recognition, RISC processing, massively parallel processing, advanced memory, improved sensors, projection and holographic display, personal digital assistants and the like. Advances in computer technology will only enhance the performance of the Cube System—they will not alter its essence. We therefore wish our invention to be defined by the scope of the appended claims as broadly as the prior art will permit, and in view of the specification if need be.

APPENDIX A

Appendix A, page 1

| SUN HYDRAULICS NEGATIVE B/M |||||||
|---|---|---|---|---|---|---|
| PART NO: 152-281-001  MATERIAL: 6061 T-6 ALUMINUM ||||||  |
| REVISION LTR: 0  STOCK: 3.50 X 3.50 ||||||  |
| WRITTEN BY:  DATE: ||||||  |
| CHECKED BY:  ASS'Y P/N: FA4 ||||||  |
| APPROVED BY:  REF: ||||||  |

| FEATURES || COORDINATES || DEPTH | INCL | ROT | COMMENT |
|---|---|---|---|---|---|---|---|
| NO. | DESCRIPTION | VERT | HORIZ | | | | |
| LRB | FACE #2 | 2.875 | 3.50 | 3.438 | | | |
| 1 | 1.250 DIA DRILLED HOLE | 2.438 | 1.750 | 0.312 | | | |
| 2 | SUN STD T-10A CAVITY | 2.438 | 1.750 | 0.625 | | | |
| 3 | .562 DIA DRILLED HOLE | 2.438 | 1.750 | 3.50 | | | |
| | | | | | | | |
| LRB | FACE #5 | 3.438 | 2.875 | 3.50 | | | |
| 4 | .375-16UNC STD THD | 2.000 | 2.500 | 0.625 | | | |
| 5 | .375-16UNC STD THD | 2.000 | 0.375 | 0.625 | | | |
| | | | | | | | |
| LRT | FACE #6 | 3.438 | 3.50 | 2.875 | | | |
| 6 | .438-14UNC STD THD HOLE | 2.547 | 2.875 | 1.062 | | | |
| 7 | .438-14UNC STD THD HOLE | 2.547 | 0.625 | 1.062 | | | |
| 8 | .438-14UNC STD THD HOLE | 1.453 | 2.875 | 1.062 | | | |
| 9 | .438-14UNC STD THD HOLE | 1.453 | 0.625 | 1.062 | | | |
| 10 | .875 DIA DRILLED HOLE | 2.000 | 1.750 | 2.438 | | | |
| | | | | | | | |
| LLT | FACE #7 | 3.438 | 2.875 | 3.50 | | | |
| | | | | | | | |
| LLB | FACE #8 | 3.438 | 3.50 | 2.875 | | | |
| 11 | SUN STD .250-18 NPTF PORT | 0.438 | 1.750 | | | | |
| 12 | .422 DIA DRILLED HOLE | 0.438 | 1.750 | 1.312 | | | |
| | | | | | | | |
| URT | FACE #10 | 2.875 | 3.50 | 3.438 | | | |
| 13 | .438-14UNC STD THD HOLE | 0.891 | 2.875 | 1.062 | | | |
| 14 | .438-14UNC STD THD HOLE | 0.891 | 0.625 | 1.062 | | | |
| 15 | .438-14UNC STD THD HOLE | 1.984 | 2.875 | 1.062 | | | |
| 16 | .438-14UNC STD THD HOLE | 1.984 | 0.625 | 1.062 | | | |
| LTR | DESCRIPTION | DRWN | CHKD | REL # | | | DATE |

- 45 -

APPENDIX A: Page 2

TSUGAMI CNC FEATURE-BASED PROGRAM

:4444(150-52-3.1)
(RUN ONLY ON S M A L L MACHINE J)
(USE PALLET PF1 high RISE large JAWS)
(PLACE THE BLOCK IN FIXTURE WITH THE STRIPE ON BOTTOM AT RIGHT )
(THIS PROGRAM WILL MACHINE 4 PIECES PER PALLET)
(   loc- .406 SPIRAL POINT DRILL = 35)
(   loc- .953 DRILL = 31)
(   loc- .906 DRILL = 62)
(   loc-12 SAE FORM REAMER = 58)
(   loc-1.062-12 SAE TAP = 43)
(   info- .406 SPIRAL POINT DRILL = 9.93-2800-14,0-0.122-P106 )
(   info- .953 DRILL = 8.0709-1200-11.0.0.2803-W217 )
(   info- .906 DRILL = 9.9295-1270-11.0.0.2405-X3H6 )
(   info-12 SAE FORM REAMER = 5.9449-520-5.0.1.0331-T107 )
(   info-1.062-12 SAE TAP = 8.498-310-22.0.0.1366-P1Y3 )
N 5 G20 G40 G49 G80 G98 H00 D00 M91
N 10 G28, Z0.0 G91
N 15 G28 X0.0 Y0.0 B0
N 20 G90 G92 X6.5 Y8.125 Z0.0
N 25 T35 (.406 SPIRAL POINT DRILL CALLED)
N 30 M06 (.406 SPIRAL POINT DRILL IN SPINDLE)
N 35 G00 Z-1.1492 S2800 F14.0 X6.125 Y0.375 M03
N 40 G83 Q.35 R-8.22 Z-10.042 M08
(   other .406 SPIRAL POINT DRILL GOING -1.6 DEEP)
(   stb FACE ON FIXTURE upper AT X = 6.125 Y = 0.375)
N 45 G83 Q.35 X6.125 Y3.625 R-8.22 Z-10.042
(   other .406 SPIRAL POINT DRILL GOING -1.6 DEEP)
(   stb FACE ON FIXTURE upper AT X = 6.125 Y = 3.625)
N 50 G83 Q.35 X-6.125 Y0.375 R-8.22 Z-10.042
(   other .406 SPIRAL POINT DRILL GOING -1.6 DEEP)
(   por FACE ON FIXTURE lower AT X = -6.125 Y = 0.375)
N 55 G83 Q.35 X-6.125 Y3.625 R-8.22 Z-10.042
(   other .406 SPIRAL POINT DRILL GOING -1.6 DEEP)
(   por FACE ON FIXTURE lower AT X = -6.126 Y = 3.625)
N 60 B90
N 65 G83 Q.35 X-6.125 Y3.625 R-8.22 Z-10.042
N 70 G83 Q.35 X-6.125 Y0.375 R-8.22 Z-10.042
N 75 G83 Q.35 X6.125 Y3.625 R-8.22 Z-10.042
N 80 G83 Q.35 X6.125 Y0.375 R-8.22 Z-10.042

APPENDIX A: Page 3

```
N 85 B180
N 90 G83 Q.35 X6.125 Y0.375 R-8.22 Z-10.042 T31 (.953 DRILL CALLED)

N 95 G83 Q.35 X6.125 Y3.625 R-8.22 Z-10.042
N 100 G83 Q.35 X-6.125 Y0.375 R-8.22 Z-10.042
N 105 G83 Q.35 X-6.125 Y3.625 R-8.22 Z-10.042
N 110 B270
N 115 G83 Q.35 X-6.125 Y3.625 R-8.22 Z-10.042
N 120 G83 Q.35 X-6.125 Y0.375 R-8.22 Z-10.042
N 125 G83 Q.35 X6.125 Y3.625 R-8.22 Z-10.042
N 130 G83 Q.35 X6.125 Y0.375 R-8.22 Z-10.042
N 135 G80
N 140 G28 G49, Z0.0 X6.125 Y0.375 M09
N 145 M06 (.953 DRILL IN SPINDLE)
N 150 G00 Z-3.0083 S1200 F11.0 X0.0 Y1.469 M03
N 155 G81 R-5.0791 Z-6.2874 M08
(    12 SAE port .953 DRILL GOING -0.828 DEEP)
(    aft FACE ON FIXTURE center AT X = 0.0.Y = 1.469)
N 160 B0
N 165 G81 X0.0 Y1.469 R-5.0791 Z-6.2874
N 170 B90
N 175 G81 X0.0 Y1.469 R-5.0791 Z-6.2874 T62 (.906 DRILL CALLED)
N 180 B180
N 185 G81 X0.0 Y1.469 R-5.0791 Z-6.2874
N 190 G80
N 195 G28 G49 Z0.0 X0.0 .469 M09
N 200 M06 (.906 DRILL IN SPINDLE)
N 205 G00 Z-1.1497 S1270 F11.0 X0.0 Y1.469 M03
N 210 G83 Q.4 R-3.2205 Z-5.061 M08
(    12 SAE port .906 DRILL GOING -1.5 DEEP)
(    aft FACE ON FIXTURE center AT X = 0.0 Y - 1.469)
N 215 B270
N 220 G83 Q.4 X0.0 Y1.469 R-3.2205 Z-5.061
N 225 B0
N 230 G83 Q.4 X0.0 Y.1469 R-3.2205 Z-5.061 T58 (12 SAE FORM REAMER CALLED)
N 235 B90
N 240 G83 Q.4 X0.0 Y1.469 R-3.2205 Z-5.061
N 245 G80
N 250 G28 G49 Z0.0 X0.0 Y1.469 M09
N 255 M06 (12 SAE FORM REAMER IN SPINDLE)
N 260 G00 Z-5.1343 S520 F5.0 X0.0 Y1.469 M03
N 265 G82 P500 R-7.2051 Z-8.3532 M08
```

```
(   12 SAE port 12 SAE FORM REAMER GOING -0.015 DEEP)
(   aft FACE ON FIXTURE center AT X = 0.0 Y = 1.469)
N 270 B180
N 275 G82 P500 X0.0 Y1.469 R-7.2051 Z-8.3532
N 280 B270
```

APPENDIX A: Page 4

```
N 285 G82 P500 X0.0 Y1.469 R-7.2051 Z-8.3532 T43 (1.062-12 SAE TAP CALLED)
N 290 B0
N 295 G82 P500 X0.0 Y1.469 R-7.2051 Z-8.3532
N 300 G80
N 305 G28 G49 Z0.0 X0.0 Y1.469 M09
N 310 M06 (1.062-12 SAE TAP IN SPINDLE)
N 315 G00 Z-2.5812 S310 F22.0 X0.0 Y1.469 M03
N 320 G84 R-4.252 Z-5.359 M08
(   12 SAE port 1.062-12 SAE TAP GOING -0.607 DEEP)
(   aft FACE ON FIXTURE center AT X = 0.0 Y = 1.469)
N 325 B90
N 330 G84 X0.0 Y1.469 R-4.252 Z-5.359
N 335 B180
N 340 G84 X0.0 Y1.469 R-4.252 Z-5.359 (NO MORE TOOLS)
N 345 B270
N 350 G84 X0.0 Y1.469 R-4.252 Z-5.359
N 355 G80
N 360 G28 G49 Z0.0 X0.0 Y1.469 M09
N 365 B0
N 370 M05
N 375 M60
N 380 M96
```

APPENDIX B

Pseudo Code For The Cube System

Demand

```
5       CreateJobObject
        {
        Set member data to base part or item number ordered.
        Evaluate currency level of order item design.
        Evaluate task approvals for order item.
10      Set member currency data.
        Set member approval data.
        Go to GetObjectPartProcess.
        }

15      GetObjectPartProcess
        {
        Use member currency and approval data.
        Find process method based on order item data levels.
        Set feature data members.
20      Go to SetObjectDueDate.
        }

SetObjectDateDue
        {
25      Set member data to quantity requested of order item.
        Evaluate order item request date.
        Set member data for order item request date.
        Go to JobObjectCreated.
        }
30
        JobObjectCreated
        {
        Store and activate this JobObject.
        Go to InitializeFeatureObject.
35      }

InitializeFeatureObject

SetFeatureObjectID
40      {
        Set process feature member ID.
        Evaluate feature characteristics.
        Set feature base information.
        Go to GetFeatureObjectDescription.
45      }
```

Appendix B, Page 1

```
GetFeatureObjectDescription
{
Get feature subjective information.
Get and set feature spatial data.
Get feature space requirements.
Go to GetFeatureObjectProcess.
}

GetFeatureObjectProcess
{
Set production data.
Set any special characteristics.
Go to GetFeatureObjectResource.
}

GetFeatureObjectResource
{
For each resource data member,
     go to InitializeResourceObject.
Go to FeatureInteraction.
}
```

InitializeResourceObject

```
SetResourceObjectID
{
Get resource identification.
Set data member resource ID.
Go to GetResourceObjectDescription.
}

GetResourceObjectDescription
{
Get resource general description.
Get specific resource parameters.
Get resource supply level.
Go to GetResourceObjectUsageData.
}

GetResourceObjectUsageData
{
Set up resource usage tables.
While not the last id for this resource,
     go to ResourceInteraction for this resource,
     go to SetResourceLoadandTime.
Go to InitializeFeatureObject.
}
```

Appendix B
Page 2

```
        SetResourceLoadandTime
        {
        Set data member load.
        Set data member time.
5       Return to GetResourceObjectUsageData loop.
        }

ResourceInteraction

10      SetInstanceThisResource
        {
        Get this unique resource object location.
        Set table entry id.
        Go to SetInstanceThisDate.
15      }

SetInstanceThisDate
        {
        Get data member for date due.
20      Set data resource id member for date.
        Go to GetInstanceLoad.
        }

GetInstanceLoad
25      {
        Evaluate this resource load this date.
        Set usage entry in table.
        Return to GetResourceObjectUsageData loop.
        }
30
        FeatureInteraction SetInstanceThisFeature
        {
35      Store and activate this feature.
        If this is the last feature date member,
            go to InitializeSpaceObject.
        Go to InitializeFeatureObject.
        }
40
        InitializeSpaceObject SetSpaceObjectID
        {
45      Get space identification.
        Set data member space ID.
        Go to GetSpaceObjectDescription.
        }
```

```
GetSpaceObjectDescription
{
Get space general description.
Get specific space parameters.
Get space supply level.
Go to GetSpaceObjectData.
}

GetSpaceObjectData
{
Set up space usage tables.
While not the last id for this space,
     go to SpaceInteraction for this space,
     go to SetSpaceTimeandLoad.
Go to EvaluateObjects.
}

SetSpaceTimeandLoad
{
Set data member load.
Set data member time.
Return to GetSpaceObjectData loop.
}
```

SpaceInteraction

```
SetInstanceThisSpace
{
Get this unique space object location.
Set table entry id.
Go to SetInstanceThisDate.
}

SetInstanceThisDate
{
Get data member for date due.
Set data space id member for date.
Go to GetInstanceLoad.
}

GetInstanceLoad
{
Evaluate this space load this date.
Set usage entry in table.
Return to GetSpaceObjectData loop.
}
```

Appendix B
Page 4

```
EvaluteObjects
{
Evaluate JobObject and component task instances.
If members qualify accept OrderObject and instantiate all member of
the OrderObject class.
If task limits exist, set limiting object, set quantity and date
members, instantiate the limited members of the OrderObject class and
recycle the JobObject with new quantity and date values.
}

EvaluateDueDate
{
Evaluate this date.
If valid go to SetTimeCellAxis
Invalid reset date and go to evaluateDueDate
}

SetTimeCellAxis
{
Set time begin point.
Set time amount point.
Set time id.
Go to LinkToScheduleRequest
}

LinkToScheduleRequest
{
Set member pointers for demand object.
Derive time_cell components.
Go to EvaluateSpaceLoad.
}

EvaluateSpaceLoad
{
If space objects full this date go to ClearTimeCellAxis.
If space object available go to EvaluateBucketLoad.
}

ClearTimeCellAxis
{
Reset time_cell object pointers.
Reduce time interval.
Go to EvaluteDueDate.
}
```

Appendix B
Page 5

```
EvaluateBucketLoad
{
If space objects not at full amount this date set min/max load for
space object,
     go to SetSpaceCellAxis.
If space object fully available set load object,
     go to SetSpaceCellAxis.
}

SetSpaceCellAxis
{
Set space id pointer.
Set space amount pointer.
Go to LinkToTimeCellAxis
}

LinkToTimeCellAxis
{
Set member pointers for space object.
Derive time_cell components.
Go to EvaluateResourceLoad.
}

EvaluateResourceLoad
{
If last resource done go to LinkResourceToTimeSpace.
If resource object exists in this time cell analyze and set available
load.
If   resource   load   not   available   this   time   cell   go   to
ClearResourceCells.
Go to SetResCellAxis.
}
ClearResourceCells
{
Reset resource cell pointers.
Go to ClearTimeCellAxis.
}

SetResCellAxis
{
Set resource id pointer.
Set resource amount pointer.
Go to Evaluate ResourceLoad.
}

LinkResourceToTimeSpace
{
Set member pointers for resource object.
Derive time_cell components.
Go to InitializeOrderObject.
}
```

Appendix B
Page 6

```
FeatureSupplyProc
{
Evaluate ResourceObjects and component task instances and determine
FeatureObject supply.
}

GetFeature
{
Derive feature object.
Set feature member values.
Set feature required resource and space lists.
Go to CycleResources.
}

CycleResources
{
For each listed resource get the resource object date.
    If resource does not exist go to GetFeature.
    Accumulate resource object existence and count.
Go to Cycle Spaces.
}

CycleSpaces
{
For each listed space get the space object date.
    If space does not exist go to GetFeature.
    Accumulate space object existence and count.
Go to AnalyzeSupply.
}

AnalyzeSupply
{
If multiple resource pattern set minimum resource object pattern count.
If single resource set single resource count.
Set space object count.
Go to UpdateSupply.
}

UpdateSupply
{
Set feature object supply count data member.
If last feature object then begin FeatureSupplyProc.
Not last feature go to GetFeature
}
```

We claim:

1. Method of computerized real time scheduling of production of products or delivery of services by a future time certain employing a computer system having one or more central processing units containing logic circuits configured by software contained in memory and one or more display menus, said computer system being controlled by user manipulation to perform, in any sequence, the steps of:
   a) describing products to be produced or services to be performed in terms of features;
   b) determining capabilities of available, callable, resources, including at least one physical workspace;
   c) deriving and cataloging doability of features from the determination of said physical workspace and resource capabilities;
   d) upon order entry, making one or more production or delivery time appointments at one or more physical workspaces when all said resources may be made simultaneously available to at least one of said physical workspaces to produce one or more of said features by a time certain.

2. Method of computerized decentralized real time scheduling of product production or performance of service by a computer system having one or more central processing units containing logic circuits configured by software contained in memory and having at least one display means, said computer system being controlled by user manipulation to perform; in any sequence, the steps of:
   a) predetermining features of said product or service, said features including the physical location for production or performance thereof;
   b) assigning a unique prime data identifier to said product or service;
   c) entering an order for said product or service only if it is doable, said order entry including said prime data identifier;
   d) storing said order entry as data in unalterable and retrievable form in an archival portion of said memory, said order being date and time stamped upon storing;
   e) providing time and resource allocation control programs to one or more marketing, order entry, shipping, shop, accounting, engineering, professional, assembly, materials, inventory, quality control, service and management operational functions;
   f) retrieving said prime data identifier(s) from said archival memory by at least one of said allocation programs;
   g) assigning specified ones of said product or service features to one or more of said operational functions as task(s) to be completed in accord with said allocation program(s);
   h) assigning task completion identifiers to said prime data identifier as each of said tasks is completed to create updated prime data identifiers;
   i) storing said updated prime data identifiers and data in unalterable and retrievable form in said archival memory, said updated prime data identifiers being date and time stamped upon storing;
   j) each of said allocation programs interrogating said archival memory for updated prime data identifiers of interest to relevant tasks assigned the respective operational functions to which said allocation program relates;
   k) said allocation programs initiating the one or more tasks assigned to its operational function upon identifying a next preceding updated prime data identifier in said archival memory to provide non-iterative task completion without central control or central monitoring in a proactive, demand-driven, resource contention avoidance pull-through production system.

3. Method for computerized implementation of a demand-driven pull-through manufacturing system by use of a computer system having one or more central processing units and a memory containing software configuring said computer to perform, in any sequence, the steps of:
   a) providing a product or part order;
   b) deriving a Negative Bill of Materials (NBOM) from said product or part order when said order does not include a related NBOM;
   c) archiving said NBOM in said computer memory;
   d) permitting access to said NBOM by one or more of order entry, primary handling, secondary handling, shops, accounting, engineering, professional, assembly, materials, inventory, packaging, shipping and quality control functions;
   e) inputting status reports as work is completed in one or more of order entry, primary handling, secondary handling, shops, accounting, engineering, professional, assembly, materials, inventory, packaging, shipping and quality control functions to said memory, said status reports being uniquely identified as related to said NBOM for query by said other functions.

4. A method of display of contentions between availability of resources to be provided to workspaces in time to fulfill product or service production orders, requests or demands (jobs), comprising the steps of:
   a) providing a computer display means driven by a CPU having memory and logic circuits configurable by software;
   b) providing software configuring said CPU logic circuits in response to said user control to display:
      i) time on a first axis in a plurality of discreet unit cells, time zero ($T_0$) being at a defined position on said axis;
      ii) workspaces or jobs assigned to a given workspace on a second axis;
      iii) resources on a third axis; and
      iv) at least two of said axes being simultaneously displayable orthogonal to each other;
   c) determining any conflicts in availability of resources, which are required to produce said product or perform said service, deliverable to said workspace; and
   d) displaying such conflicts as resource contentions on said display means.

5. A resource contention display method as in claim 4 which includes the step of:
   a) successively incrementing the display of time cells from future time toward $t_0$ along said time axis while displaying at least one of said contentions, jobs, workspaces or resources.

6. A resource contention display method as in claim 5 which includes the step of:
   a) resolving resource contentions.

7. A near real time job scheduling system software program that, when installed in a computer system having logic circuits configured by said software, enables a user to perform, upon data input and control by said user, the functions of:
   a) identifying features necessary to produce a product, a service or supply a resource (job) by a defined time;

b) identifying resources necessary to create said features;

c) identifying workspaces at which identified resources are to be mustered for a necessary time period to create the identified features;

d) determining availability of said identified resources at said workspaces before said defined time;

e) detecting contentions in availability of resources or workspaces;

f) tracking alternate probable paths by scoring the success of production operations, and storing resource history patterns as prime data to assist in resolving conflicts between capacity-limited resources;

g) ranking said probable paths;

h) displaying to said user any resource contentions which are detected so that said user may reallocate resources to other workspaces to eliminate resource contentions for said job before said defined time occurs; and i) said program providing a demand-driven pull-through feature-based system for making appointments for operating in near real time to make appointments for said jobs at said workspace in predetermined units of time in a selected environment in response to a demand for activity placed on said environment by a customer order.

8. A near real time scheduling software program as in claim 7 wherein:

a) said step of identifying features includes defining processes performed at a workspace by selected resources and providing them to memory in a cubic coordinate system having orthogonal axes with a single 0,0,0 origin.

9. A scheduling decision support program for scheduling jobs to be performed by a defined time, said program installed in a computer system having logic circuits configured thereby to enable a user to perform, upon data input and control of said computer by said user, the functions of:

a) developing at least one prioritized list of primary and alternate workspaces in which said job can be performed;

b) developing a list of floating resources that could be employed to complete a specified job without considering availability of these resources at said workspaces;

c) dividing time between the time of order until the defined time into time blocks;

d) attempting to load jobs into at least one workspace during at least one time block to determine if necessary floating resources will be available in said time block;

e) for a given job, identifying and locating any resources missing from at least some of said workspaces;

f) attempting to make appointments for missing resources at a workspace during at least one of said time blocks;

g) determining if there are contentions for resources during the time block(s) picked;

h) attempting to shift jobs into other time block(s) or other workspace(s) prior to said defined time in order to provide resources at a workspace to complete said job; and i) highlighting scarce resources so they can be monitored and allocated by said user.

10. A scheduling support display program for display of job scheduling in unit blocks of time before a defined due date, said program installed in a computer system having logic circuits configured by said program to enable a user to perform, upon data input and control by said user, the functions of;

a) display of unit blocks of time along a first, horizontal X axis with time moving dynamically from right to left, with "now" in time normally at the left end of the line and the immediate future to the right of now and the distant future further right;

b) display of a job queue for at least one selected workspace, selected from workcenters for fixed resources and storage places for floating resources, along a second, vertical, Y axis;

c) optionally displaying at least selected ones of all resources necessary to perform a job at a given workspace along a third, front-to-back, Z axis;

d) receiving data on job progress at said workspaces including job completion data;

e) moving jobs upon completion off the left end of the time axis;

f) adding new jobs in a workspace job queue;

g) display of presence or absence of necessary floating resources along with present reported location of missing resources and whether there are contentions for commitment of said resources at other workspaces or for other jobs during at least part of said time block;

h) halting movement of the job queue for a given workspace when a workspace or resource becomes unavailable; and i) moving said halted job queue for said workspace back to the future along said time axis.

11. A general purpose computer having installed therein and capable of executing software having functions to support decisions to muster resources at one or more workspaces (workspace inventory) in time to fulfill a job order by a defined time, said software functions comprising;

a) initializing a job order, said initialization further comprising the functions of:

i) identifying the object of the job order and a defined time for delivery;

ii) analyzing said object to provide a Negative Bill Of Materials (NBOM) for said object, said NBOM listing the features which characterize said object in a three dimensional orthogonal system;

iii) determining the capability of providing the features of said object;

iv) communicating a rich response to the customer if unable to provide said capability by said defined time;

v) querying the resource inventory to determine availability of resources for production of said object within the defined time, and scheduling said resources;

vi) communicating a rich response to the customer if there are insufficient resources to provide all of the features within the defined time;

vii) querying the workspace inventory to determine availability of at least one workspace to provide said features;

viii) continuously assessing the "best path" to complete the job using non-deterministic methods and lopping off paths as they become impossible;

ix) booking jobs in at least one queue for at least one workspace; and x) creating a three-dimensional orthogonal coordinate system for each job booked with time on one axis, resources on a second axis linked to the time axis, and jobs queued in a workspace on a third axis linked to said time axis;

b) querying said feature inventory to ensure availability of features yet to be provided;
c) querying said resource inventory to ensure availability of sufficient resources to provide said features;
d) querying workspace inventory to ensure availability of workspace;
e) comparing feature supply with feature demand;
f) comparing resource demand with resource supply;

h) dynamically adjusting queued job location along the time cell axis to accommodate changes or contentions in resource or workplace availability to produce the demanded features by a time certain, selected from the original job order time for delivery or any rescheduled time.

* * * * *